(12) United States Patent
Rakowski et al.

(10) Patent No.: US 8,173,328 B2
(45) Date of Patent: May 8, 2012

(54) INTERCONNECTS FOR SOLID OXIDE FUEL CELLS AND FERRITIC STAINLESS STEELS ADAPTED FOR USE WITH SOLID OXIDE FUEL CELLS

(75) Inventors: James M. Rakowski, Allison Park, PA (US); Charles P. Stinner, Wexford, PA (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 13/150,372

(22) Filed: Jun. 1, 2011

(65) Prior Publication Data

US 2011/0229803 A1    Sep. 22, 2011

Related U.S. Application Data

(62) Division of application No. 11/169,105, filed on Jun. 28, 2005, now Pat. No. 7,981,561.

(60) Provisional application No. 60/690,671, filed on Jun. 15, 2005.

(51) Int. Cl.
*H01M 2/38* (2006.01)
*H01M 2/40* (2006.01)
*H01M 8/24* (2006.01)

(52) U.S. Cl. .......................... 429/535; 429/457; 429/514

(58) Field of Classification Search .................. 429/457, 429/512–516, 535; 427/115, 122, 126.3; 419/6, 30, 38; 205/640–641, 646, 651, 660, 205/662–663, 666, 686; 451/287–288, 290; 257/E21.303–E21.304, E21.313

See application file for complete search history.

(56) References Cited

U.S. PATENT DOCUMENTS 2,338,321 A    1/1944  Faust
(Continued)

FOREIGN PATENT DOCUMENTS

CA    2137096    6/1995
(Continued)

OTHER PUBLICATIONS

Horita et al., "Stability of Fe-Cr alloy interconnects under CH4-H2O atmosphere for SOFCs," Journal of Power Sources, 188 (2003) pp. 35.43.

(Continued)

*Primary Examiner* — Barbara Gilliam
*Assistant Examiner* — Claire L Roe
(74) *Attorney, Agent, or Firm* — K & L Gates LLP; Patrick J. Viccaro; John E. Grosselin, III

(57) ABSTRACT

Various embodiments relate to interconnects for solid oxide fuel cells ("SOFCs") comprising ferritic stainless steel and having at least one via that when subjected to an oxidizing atmosphere at an elevated temperature develops a scale comprising a manganese-chromate spinel on at least a portion of a surface thereof, and at least one gas flow channel that when subjected to an oxidizing atmosphere at an elevated temperature develops an aluminum-rich oxide scale on at least a portion of a surface thereof. Other embodiments relate to interconnects comprising a ferritic stainless steel and having a fuel side comprising metallic material that resists oxidation during operation of the SOFCs, and optionally include a nickel-base superalloy on the oxidant side thereof. Still other embodiments relate to ferritic stainless steels adapted for use as interconnects comprising ≦0.1 weight percent aluminum and/or silicon, and >1 up to 2 weight percent manganese. Methods of making interconnects are also disclosed.

16 Claims, 8 Drawing Sheets

U.S. PATENT DOCUMENTS

| | | |
|---|---|---|
| 2,692,853 A | 10/1954 | Gamble |
| 3,807,991 A | 4/1974 | Gregory et al. |
| 3,937,646 A | 2/1976 | Houston |
| 3,953,201 A | 4/1976 | Wood et al. |
| 3,957,544 A | 5/1976 | Pinnow et al. |
| 3,963,532 A | 6/1976 | Demo, Jr. |
| 3,993,445 A | 11/1976 | Reen |
| 4,010,049 A | 3/1977 | Rarey |
| 4,047,981 A | 9/1977 | Arnold et al. |
| 4,049,431 A | 9/1977 | Hagel et al. |
| 4,059,440 A | 11/1977 | Takemura et al. |
| 4,071,083 A | 1/1978 | Droin |
| 4,078,919 A | 3/1978 | Kado et al. |
| 4,097,311 A | 6/1978 | Ishibashi et al. |
| 4,119,765 A | 10/1978 | Pinnow et al. |
| 4,140,526 A | 2/1979 | Moroishi et al. |
| 4,179,285 A | 12/1979 | Tanczyn |
| 4,192,934 A | 3/1980 | Takahashi et al. |
| 4,248,943 A | 2/1981 | Ludwig et al. |
| 4,261,739 A | 4/1981 | Douthett et al. |
| 4,282,291 A | 8/1981 | Demo, Jr. |
| 4,286,986 A | 9/1981 | Barneman |
| 4,331,474 A | 5/1982 | Espy |
| 4,340,424 A | 7/1982 | Katon et al. |
| 4,360,381 A | 11/1982 | Tarutani et al. |
| 4,374,666 A | 2/1983 | Devine, Jr. |
| 4,374,683 A | 2/1983 | Koike et al. |
| 4,408,709 A | 10/1983 | Devine, Jr. |
| 4,418,859 A | 12/1983 | Devine, Jr. |
| 4,456,482 A | 6/1984 | Nichol et al. |
| 4,456,483 A | 6/1984 | Deverell et al. |
| 4,464,207 A | 8/1984 | Kindlimann |
| 4,465,525 A | 8/1984 | Yoshimura et al. |
| 4,484,956 A | 11/1984 | Shida et al. |
| 4,640,722 A | 2/1987 | Gorman |
| 4,690,798 A | 9/1987 | Narutani et al. |
| 4,703,885 A | 11/1987 | Lindgren et al. |
| 4,735,771 A | 4/1988 | Corwin |
| 4,736,884 A | 4/1988 | Tsuyama et al. |
| 4,781,996 A | 11/1988 | Toriya et al. |
| 4,798,634 A | 1/1989 | McCune, III et al. |
| 4,834,808 A | 5/1989 | Hill |
| 4,884,708 A | 12/1989 | Lange et al. |
| 4,916,032 A | 4/1990 | Humberstone |
| 4,942,922 A | 7/1990 | Redmerski et al. |
| 4,950,562 A | 8/1990 | Yoshida et al. |
| 4,960,562 A | 10/1990 | Okuda et al. |
| 4,964,926 A | 10/1990 | Hill |
| 4,973,524 A | 11/1990 | Huebner et al. |
| 4,994,122 A | 2/1991 | Debold et al. |
| 4,999,158 A | 3/1991 | Carwin |
| 5,034,288 A | 7/1991 | Bossel |
| 5,066,370 A | 11/1991 | Andreshak et al. |
| 5,091,024 A | 2/1992 | DeBold et al. |
| 5,139,896 A | 8/1992 | Smith et al. |
| 5,151,248 A | 9/1992 | Ebara et al. |
| 5,217,544 A | 6/1993 | Baltenneck et al. |
| 5,222,652 A | 6/1993 | Gibbs et al. |
| 5,227,256 A * | 7/1993 | Marianowski et al. ........ 429/423 |
| 5,228,932 A | 7/1993 | Shimizu et al. |
| 5,230,752 A | 7/1993 | Bourgain et al. |
| 5,273,837 A | 12/1993 | Aitken et al. |
| 5,277,256 A | 1/1994 | Bailey |
| 5,286,310 A | 2/1994 | Carinci et al. |
| 5,286,442 A | 2/1994 | Uematsu et al. |
| 5,299,731 A | 4/1994 | Liyanage et al. |
| 5,301,218 A | 4/1994 | Taylor, Jr. et al. |
| 5,302,214 A | 4/1994 | Uematsu et al. |
| 5,332,544 A | 7/1994 | Uematsu et al. |
| 5,340,415 A | 8/1994 | Koike et al. |
| 5,377,246 A | 12/1994 | Taylor, Jr. et al. |
| 5,405,575 A | 4/1995 | Yazawa et al. |
| 5,424,144 A | 6/1995 | Woods, Jr. |
| 5,496,515 A | 3/1996 | Pedacce et al. |
| 5,563,003 A | 10/1996 | Suzuki et al. |
| 5,601,664 A | 2/1997 | Kosa et al. |
| 5,624,769 A | 4/1997 | Li et al. |
| 5,626,817 A | 5/1997 | Sawaragi et al. |
| 5,672,215 A | 9/1997 | Azuma et al. |
| 5,695,825 A | 12/1997 | Scruggs |
| 5,727,586 A | 3/1998 | Taylor |
| 5,733,682 A | 3/1998 | Quadakkers et al. |
| 5,733,683 A | 3/1998 | Searson et al. |
| 769,974 A | 6/1998 | Barnett et al. |
| 5,769,974 A | 6/1998 | Masteller et al. |
| 5,795,411 A | 8/1998 | Terrien et al. |
| 5,866,065 A | 2/1999 | Herbelin et al. |
| 5,868,875 A | 2/1999 | Yoshitake et al. |
| 5,942,184 A | 8/1999 | Azuma et al. |
| 5,942,349 A | 8/1999 | Badwall |
| 6,051,081 A | 4/2000 | Valle Echevarria et al. |
| 6,054,231 A | 4/2000 | Virkar et al. |
| 6,086,689 A | 7/2000 | Sassoulas et al. |
| 6,093,233 A | 7/2000 | Magnin |
| 6,106,638 A | 8/2000 | Parados et al. |
| 6,106,967 A | 8/2000 | Virkar |
| 6,114,058 A | 9/2000 | Judkins et al. |
| 6,116,092 A | 9/2000 | Ohmi et al. |
| 6,150,040 A * | 11/2000 | Suzuki et al. ................ 428/667 |
| 6,306,341 B1 | 10/2001 | Yokota et al. |
| 6,312,533 B1 | 11/2001 | Yokota et al. |
| 6,316,128 B1 | 11/2001 | Ishio |
| 6,326,096 B1 | 12/2001 | Virkar et al. |
| 6,329,080 B1 | 12/2001 | Ishio |
| 6,379,476 B1 | 4/2002 | Tarutani et al. |
| 6,397,223 B1 * | 5/2002 | Kori ..................................... 1/1 |
| 6,444,340 B1 | 9/2002 | Jaffrey |
| 6,447,340 B1 | 9/2002 | Wu |
| 6,492,050 B1 | 12/2002 | Sammes |
| 6,569,221 B2 | 5/2003 | Berglund |
| 6,582,835 B2 | 6/2003 | Antoni et al. |
| 6,585,799 B1 | 7/2003 | Zeze et al. |
| 6,588,494 B1 | 7/2003 | Mazurier et al. |
| 6,608,463 B1 | 8/2003 | Kelly et al. |
| 6,613,468 B2 | 9/2003 | Simpkins et al. |
| 6,641,780 B2 | 11/2003 | Grubb |
| 6,645,318 B2 | 11/2003 | Takahashi et al. |
| 6,663,984 B2 | 12/2003 | Vostrikov et al. |
| 6,703,153 B1 | 3/2004 | Cubukcu et al. |
| 6,733,601 B2 | 5/2004 | Yazawa et al. |
| 6,786,981 B2 | 9/2004 | Yazawa et al. |
| 6,815,116 B2 | 11/2004 | Lenz et al. |
| 6,828,055 B2 | 12/2004 | Kearl |
| 6,835,487 B2 | 12/2004 | Takao et al. |
| 6,843,960 B2 * | 1/2005 | Krumpelt et al. ................ 419/6 |
| 7,842,434 B2 | 11/2010 | Rakowski et al. |
| 7,981,561 B2 | 7/2011 | Rakowski et al. |
| 2001/0012576 A1 | 8/2001 | Christiansen |
| 2001/0051283 A1 | 12/2001 | Ishio |
| 2002/0012602 A1 | 1/2002 | Takahashi et al. |
| 2002/0048699 A1 | 4/2002 | Steele et al. |
| 2002/0048700 A1 | 4/2002 | Virkar et al. |
| 2002/0055028 A1 | 5/2002 | Ghosh et al. |
| 2003/0003339 A1 | 1/2003 | Keegan |
| 2003/0059335 A1 | 3/2003 | Quadadakkers et al. |
| 2003/0059668 A1 | 3/2003 | Visco et al. |
| 2003/0064612 A1 | 4/2003 | England et al. |
| 2003/0082434 A1 | 5/2003 | Wang et al. |
| 2003/0116536 A1 | 6/2003 | Ohtani et al. |
| 2003/0124019 A1 | 7/2003 | Grubb |
| 2003/0134171 A1 | 7/2003 | Sarkar et al. |
| 2003/0170526 A1 | 9/2003 | Hodgson et al. |
| 2003/0194592 A1 | 10/2003 | Hilliard |
| 2003/0170544 A1 | 11/2003 | Jacobson et al. |
| 2003/0215689 A1 | 11/2003 | Keegan |
| 2003/0224232 A1 | 12/2003 | Browall et al. |
| 2003/0224234 A1 | 12/2003 | Steele et al. |
| 2003/0231973 A1 | 12/2003 | Krumpelt et al. |
| 2004/0023101 A1 | 2/2004 | Jacobson et al. |
| 2004/0028988 A1 | 2/2004 | Bunker |
| 2004/0043269 A1 | 3/2004 | Taniguchi et al. |
| 2004/0050462 A1 | 3/2004 | Grubb |
| 2004/0101733 A1 | 5/2004 | Yamanis et al. |
| 2004/0170881 A1 | 9/2004 | Nakata |
| 2004/0200187 A1 | 10/2004 | Warrier et al. |
| 2005/0045250 A1 | 3/2005 | Rakowski |
| 2005/0076976 A1 | 4/2005 | Ide et al. |

| | | | |
|---|---|---|---|
| 2006/0006074 A1 | 1/2006 | Liu et al. | |
| 2006/0285993 A1 | 12/2006 | Rakowski | |
| 2006/0286432 A1 | 12/2006 | Rakowski et al. | |
| 2006/0286433 A1 | 12/2006 | Rakowski et al. | |

FOREIGN PATENT DOCUMENTS

| | | |
|---|---|---|
| CA | 2240270 | 6/1997 |
| DE | 19547699 A1 | 7/1997 |
| DE | 10025108 A1 | 11/2001 |
| GB | 1 218 957 | 1/1971 |
| JP | 56-153000 | 11/1981 |
| JP | 60-46352 A | 3/1985 |
| JP | 62-205300 | 9/1987 |
| JP | 06-172933 | 6/1994 |
| JP | 09-067672 | 3/1997 |
| JP | 09-209092 | 8/1997 |
| JP | 09-268350 | 10/1997 |
| JP | 10-088391 | 4/1998 |
| JP | 10-280103 | 10/1998 |
| JP | 2000-119816 | 4/2000 |
| JP | 2000-294256 | 10/2000 |
| JP | 2003-187828 | 7/2003 |
| JP | 2005-23353 A | 1/2005 |
| WO | WO 89/09841 A1 | 10/1989 |
| WO | WO 97/23006 A2 | 6/1997 |
| WO | WO 98/21028 A1 | 5/1998 |
| WO | WO 98/25316 A1 | 6/1998 |
| WO | WO 99/10554 | 4/1999 |
| WO | WO 99/25890 | 5/1999 |
| WO | WO 01/91215 | 11/2001 |
| WO | WO 02/13300 A1 | 2/2002 |
| WO | WO 03/006149 A1 | 1/2003 |

OTHER PUBLICATIONS

Ugi Takumi, "Production of Cold Rolled Ferrite Stainless Steel Strip" Patent Abstracts of Japan, Publication No. 08269754, Publication Date Oct. 15, 1996.

Quadakkers et al., "Suitability of Ferritic Steels for Application as Construction Materials for SOFC Interconnects," Proceedings of the 4.sup.th European Solid Oxide Fuel Cell Forum, Jul. 10-14, 2000, Lucerne, Switzerland, pp. 827-836.

"Allegheny Ludlum E-Brite 26-1 Alloy," Alloy Digest, Jan. 1979.

"Allegheny Ludlum AL 29-4-2," Alloy Digest, Dec. 1986.

"ALFA-IV Alloy," Alloy Digest, Apr. 1997.

Ralph et al., "Materials for Lower Temperature Solid Oxide Fuel Cells," Journal of Materials Science, vol. 36 (2001) pp. 1161-1172.

Yokoyama Hiroyasu et al. "Manufacture of Rolled Clad Steel Plate of Nickel Base Alloy Excellent in Base Metal Toughness," Patent Abstracts of Japan, Publication No. 04-182080, Publication Date Jun. 29, 1992.

Yokoyama Hiroyasu et al. "Production of Nickel-Based Alloy Rolled and Clad Steel Plate," Patent Abstracts of Japan, Publication No. 04-128314, Publication Date Apr. 28, 1992.

Nishiyama Yoshitaka et al. "Ferritic Stainless Steel Excellent in Fused Carbonate Corrosion Resistance," Patent Abstracts of Japan, Publication No. 08-188853, Publication Date Jul. 23, 1996.

Nazmy Mohamed "Component Member for Inducing Current Between High-Temperature Fuel Cell Disposed in Adjacent Flat Lamination," Patent Abstracts of Japan, Publication No. 03-102771, Publication Date Apr. 30, 1991.

Yang et at, "Selection and Evaluation of Heat-Resistant Alloys for SOFC Interconnect Applications", Journal of the Electrochemical Society, 150 (9) pp. A1188-A1201 (2003).

Giggins et at, "The effect of alloy grain-size and surface deformation an the selective oxidation of chromium in Nl-Cr alloys at temperatures of 900° and 1100° C," Transactions of the Metallurgical Society of AIME, 245, 2509 (1969).

Rakowski et al., "The effect of surface preparation on the oxidation behavior of gamma TiAl-base interconnect alloys," Scripta Matetialia, 35, 12, 1417 (1996).

Szummer et al., "Hydrogen surface effect in ferritic stainless steels," J. of Alloys and Compounds, 293, 356 (1999).

Aries et al., "Effect of stabilizing heat treatment on characterisitics of electrolytic alumina coating on ferritic stainless steel," Materiais and Corrosion, 51, 496 (2000).

Wang, "The effect of nanocrystallization on the selective oxidation and adhesion of Al2O3 scales," Oxidation of Metals, 48 (3/4), 215 (1997).

Haynes International, Haynes 556® Alloy Brochure (2005),, avaiable at http://haynesintl.com/literature.htm, last visited Jul. 6, 2010.

Haynes International, Haynes 263® Alloy Brochure (2000), available at http://haynesintl.com/literature.htm, last visited Jul. 6, 2010.

Haynes International, Haynes HR-120® Alloy Brochure (2008) available at http://haynesintl.com/literature.htm, last visited Jul. 6, 2010.

Dictionary.com search results for 'Selectively', accessed May 14, 2009; http://www.dictionary.com.

Dictionary.com search results for 'Controllably', accessed May 14, 2009; http://www.dictionary.com.

* cited by examiner

INTERCONNECTS FOR SOLID OXIDE FUEL CELLS AND FERRITIC STAINLESS STEELS ADAPTED FOR USE WITH SOLID OXIDE FUEL CELLS

CROSS-REFERENCE TO RELATED APPLICATIONS

This application is a divisional application and claims the benefit of the filing date of co-pending U.S. patent application Ser. No. 11/169,105, filed Jun. 28, 2005, which claims the benefit of the filing date of U.S. Provisional Patent Application Ser. No. 60/690,671, filed Jun. 15, 2005. U.S. patent application Ser. No. 11/169,105 and U.S. Provisional Patent Application Ser. No. 60/690,671 are incorporated by reference herein.

BACKGROUND

The disclosure generally relates to interconnects for use with solid oxide fuel cells ("SOFCs"), and which may be used in planar solid oxide fuel cells ("PSOFCs"), and ferritic stainless steels that may be used to form interconnects for SOFCs. For example, certain non-limiting embodiments disclosed herein relate to interconnects that comprise at least one via that when subjected to an oxidizing atmosphere at an elevated temperature develops a scale comprising a manganese-chromate spinel on at least a portion of a surface thereof, and at least one gas flow channel that when subjected to an oxidizing atmosphere at an elevated temperature develops an aluminum-rich oxide scale on at least a portion of a surface thereof. Other non-limiting embodiments relate to interconnects for SOFCs comprising ferritic stainless steel and a metallic material that resists oxidation under certain operating conditions of the SOFCs. Methods of making interconnects for SOFCs and PSOFCs comprising the disclosed interconnects are also described.

Solid oxide fuel cells are fuel cells that are constructed entirely of solid-state materials. Typically SOFCs use a fast oxygen ion-conducting ceramic (typically yttria-stabilized zirconia or "YSZ") as the electrolyte, and operate in a temperature range of about 500° C. (932° F.) to 1000° C. (1832° F.) to facilitate solid-state transport. A single SOFC "cell" or subunit includes an anode and a cathode separated by the solid electrolyte. Because current generation SOFCs typically operate at temperatures up to about 1000° C., the anodes and cathodes are generally constructed from ceramic materials to avoid environmental degradation. Both the anode and cathode layers contain a network of interconnected pores though which gases may pass and are good electrical conductors (e.g., they exhibit essentially no ionic conductivity). In current generation SOFCs, the anode is typically formed from an electrically conductive nickel/YSZ composite (a ceramic/metal composite or "cermet"), wherein the nickel provides a continuous electrically conductive path, while the YSZ serves to reduce the coefficient of thermal expansion of the overall composite and to prevent the network of pores from sintering shut. The cathode may be based on, for example, lanthanum manganate ($LaMnO_3$), typically doped with strontium (replacing some of the lanthanum to yield $La_{1-x}Sr_xMnO_3$) to improve its electrical conductivity. The electrolyte is typically a thin (relative to the anode and cathode) layer of fully dense YSZ.

During operation of the SOFC cell, an oxidant (such as $O_2$ or air) is fed into the fuel cell near the cathode of the cell, where it accepts electrons from an external circuit in the following half-cell reaction:

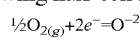

Oxygen ions generated in the half-cell reaction at the cathode pass through the YSZ electrolyte by solid-state diffusion to the electrolyte/anode interface, where they can react with a fuel, such as hydrogen, that has been introduced to the SOFC near the anode. Operationally, pure hydrogen can be used as supplied, while a hydrocarbon fuel such as methane, kerosene, or gasoline generally must be partially combusted, or reformed, to hydrogen and carbon monoxide. This may be accomplished within the fuel cell, aided by the high operating temperature and by steam injection. The fuel gas mixture penetrates the porous anode to the anode/electrolyte interface, where it reacts with the oxygen ions from the YSZ electrolyte in the following half-cell reaction:

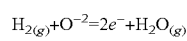

As indicated above, this half-cell reaction releases electrons that re-enter the external circuit. To maintain overall electrical charge balance, the flow of electrical charge due to oxygen ion transport through the electrolyte from cathode to anode is balanced by the flow of electrical charge due to electron conduction in the external circuit. The flow of electrons in the external circuit provides an electrical potential of approximately one volt. To generate larger voltages, fuel cells are typically not operated as single units but, instead, as "stacks" composed of a series arrangement of several individual cells with an "interconnect" joining and conducting current between the anode and cathode of immediately adjacent cells. A common stack design is the flat-plate or "planar" SOFC (or "PSOFC"). In a PSOFC, at least two, and preferably more, SOFCs are stacked together in a repeating sequence, wherein each individual SOFC is separated by an interconnect positioned between the anode of one SOFC and the cathode of an immediately adjacent SOFC within the stack.

Depending upon the design of a PSOFC, the interconnect can serve several functions, including separating and containing the reactant gases and providing a low resistance path for current so as to electrically connect the cells in series. An interconnect may also be termed a "bipolar plate" or a "separator" depending upon its function(s) in the fuel cell. In general, the interconnect material must withstand the harsh, high-temperature conditions within the cells; must be suitably electrically conductive (including any oxides or other surface films that form on the material); and must have a coefficient of thermal expansion (CTE) that is sufficiently similar to the CTE of the ceramic electrodes within the cells to ensure the requisite structural integrity and gas-tightness of the fuel cell stack.

Initial PSOFC designs used a doped lanthanum chromate ($LaCrO_3$) ceramic material as the interconnect material. $LaCrO_3$ ceramic does not degrade at the high temperatures at which SOFCs operate and has a coefficient of thermal expansion that substantially matches the other ceramic components of the fuel cell. $LaCrO_3$ ceramic, however, is brittle, difficult to fabricate, and extremely expensive. To address these deficiencies, metallic interconnects have been proposed for use in PSOFCs. These include interconnects formed from nickel-base alloys, such as AL 600™ alloy, and certain austenitic stainless steels, such as the 300 series family, the prototype of which is Type 304 alloy. Ferritic stainless steels, such as ALFA-II™ alloy, E-BRITE® alloy and AL 453™ alloy also have been proposed for use in PSOFC interconnects. Table I provides nominal compositions for the foregoing nickel-base and stainless steel alloys, all of which are available from Allegheny Ludlum Corporation, Pittsburgh, Pa.

TABLE I

| Alloy | Composition (weight percent) | | | | | | |
|---|---|---|---|---|---|---|---|
| | Ni | Cr | Fe | Al | Si | Mn | Other |
| AL 453 ™ alloy | 0.3 max. | 22 | bal. | 0.6 | 0.3 | 0.3 | 0.06Ce + La max. |
| E-BRITE ® alloy | 0.15 max. | 26 | bal. | 0.1 | 0.2 | 0.05 | 1Mo |
| ALFA-II ™ alloy | 0.3 max. | 13 | bal. | 3 | 0.3 | 0.4 | 0.4Ti |
| AL 600 ™ alloy | Ni + Co bal. | 15.5 | 8 | — | 0.2 | 0.25 | — |
| Type 304 alloy | 8 | 18 | bal. | — | — | — | — |

At the operating temperatures typical for current generation SOFC, the partial pressure of oxygen (or "$pO_2$") near the anode of a SOFC is generally lower than the $pO_2$ required for various metals commonly used as electrical conductors (e.g., copper and nickel) to form oxides. However, the $pO_2$ near the cathode of a SOFC is generally higher than the $pO_2$ required for oxide formation. Accordingly, there is a tendency for surface oxide layers to form on interconnects made from these metals when exposed to the oxidant proximate the cathode of the SOFC.

Since metals generally form oxides that either have a high electrical resistivity at the temperatures typical of PSOFC operation or rapidly thicken with time, the area specific resistance (or "ASR") of metal interconnects, as well as the resistivity of the PSOFC stack into which they are incorporated, tends to increase with time during operation of the PSOFC. For example, certain alloys, upon exposure to oxygen at high temperatures, form surface oxides that either thicken at an extremely slow rate (for example, the $Al_2O_3$ scale of ALFA-II® alloy) or are highly electrically conductive (for example, the NiO scale of pure or dispersion-strengthened nickel). However, the underlying mechanism that controls these two seemingly disparate factors (resistivity and rate of oxide formation) is essentially the same (the electronic defect structure of the oxide). Consequently, there are very few metal oxides that are both slow growing and electrically conductive.

Stainless steels have attracted interest as potential interconnect materials, in part, because in their conventional form they develop a scale consisting primarily of chromium oxide ($Cr_2O_3$). This oxide scale is both relatively slow growing and reasonably electrically conductive at typical, current generation SOFC operating temperatures. Ferritic stainless steels in particular have certain properties that make them attractive for PSOFC interconnect applications, including low cost, good fabricability, and CTE compatible with ceramic. Nevertheless, the oxidation of stainless steel interconnects during operation of a PSOFC may lead to an undesirable degradation of electrical properties of the PSOFC over time.

Another potential drawback to the utilization of stainless steels in PSOFC applications is "poisoning" of the porous electrodes, and in particular the cathodes, used in the SOFCs by chromium-bearing vapor species that may evolve from the chromium-rich oxide scale on the surface of the stainless steel during operation, particularly in the presence of water or hydrogen. Because water vapor is often present in the gas streams of an operational PSOFC, the formation of volatile chromium oxy-hydroxides (e.g., $CrO_2(OH)_2$) at lower temperatures can exacerbate the problem. Additionally, solid state diffusion of chromium from the interconnect to the adjoining cathode may occur during operation of the PSOFC and may also contribute to cathode poisoning. While the formation of a manganese-chromate spinel layer on the surface of a stainless steel interconnect may reduce such chromium migration (e.g., the evolution of chromium-bearing vapor species and/or solid state diffusion of chromium) during operation of a PSOFC, if sufficient chromium is present at the surface of the interconnect, chromium migration leading to cathode poisoning may still occur.

Various structures have been proposed for SOFC interconnects. For example, U.S. Pat. No. 6,326,096 discloses an interconnect for solid oxide fuel cells having a superalloy metallic layer with a anode-facing face, a cathode-facing face, and a metal layer, preferably nickel or copper, on the anode-facing face (see Abstract). Disclosed superalloys include Inconel® alloys, Haynes® alloys, Hastelloy® alloys, and austenitic stainless steels (see col. 4, lines 60-63).

U.S. Pat. No. 4,781,996 discloses a separator plate that is laminated on the back surface of each of the anode and the cathode of a fuel cell, and is made of an nickel-containing iron alloy containing from about 25-60% nickel in order to match the linear expansion coefficient of the separator plate with the expansion coefficient of the electrolyte plate (see col. 3, lines 18-27). Further, an oxidation resistant treating material is bonded to the cathode side of the separator and an alkali corrosion-resistant treating material is bonded to the anode side of the separator (see col. 4, lines 24-29).

U.S. Pat. No. 5,227,256 discloses a bimetallic separator plate for a fuel cell in which stainless steel may be used on the cathode face and nickel or copper on the anode face (see col. 11, lines 34-38). Further, the nickel or copper may be about 10 percent of the thickness of the separator plate (see col. 1, lines 38-40). Specifically disclosed are 300 series stainless steel alloys (see col. 11, lines 40-42). U.S. Pat. No. 5,733,683 discloses a metallic bipolar plate for high-temperature fuel cells, the plate having a body having surfaces adapted to contact electrodes of the fuel cells and passages having walls confining gases. The body of the plate is composed of a chromium-containing alloy oxidizable at the surface to form chromium oxide, the alloy being enriched with aluminum at least in regions of the walls in direct contact with the gases (see Abstract). Aluminum enrichment can be carried out using a conventional aluminum diffusion process, wherein the plate is coated with a powder mixture of inert material (such as $Al_2O_3$), a chloride/fluoride activator (such as NaCl) and aluminum powder, and exposed at 600° C. to 1300° C. under argon, or coated using CVD or PVD (see col. 3, lines 43-57). Thereafter, surfaces of the plate wherein aluminum enrichment is not desired (for example the electrical contact surfaces) are ground to remove the enriched layer of material. In order to accommodate grinding, the body of the plate is over-sized to account for material removal (see col. 3, lines 57-62).

Canadian Patent No. 2,240,270 discloses a bipolar plate consisting of a chromium oxide-forming alloy with an electrically insulating, corrosion reducing layer in the region of the gas guiding surfaces and cobalt, nickel or iron enrichment layers in the region of the electrode contact surfaces (see Abstract). As discussed above with respect to U.S. Pat. No. 5,733,683, grinding is required to remove the electrically insulating layer from the electrode contact surfaces; accordingly, the plate is over-sized to account for the material removal (see page 8, lines 10-15).

U.S. Patent Publication 2003/0059335 discloses a high temperature material that consists of a chromium oxide forming iron alloy including 12 to 28 wt % chromium, 0.01 to 0.4 wt % La, 0.2 to 1.0 wt % Mn, 0.1 to 0.4 wt % Ti, less than 0.2 wt % Si, and less than 0.2 wt % Al, wherein at temperatures of 700° C.-950° C. the material forms a $MnCr_2O_4$ spinel phase and which can be used to form a bipolar plate for a SOFC (see Abstract and paragraph [0032]).

There remains a need for interconnects for SOFCs that have oxidation properties that are tailored to the environmental conditions experienced by interconnects during operation of a PSOFC, that do not require high-temperature treatments, over-sizing or the use of expensive superalloys to achieve desired properties, and that may provide for improved electrical performance of the PSOFCs into which they are incorporated. Further, there is a need for ferritic stainless steels that are compositionally tailored for the SOFC environment and from which such interconnects may be fabricated.

SUMMARY

Various non-limiting embodiments disclosed herein relate to interconnects for use with solid oxide fuel cells. For example, one non-limiting embodiment relates to an interconnect for solid oxide fuel cells comprising (a) at least one via that when subjected to an oxidizing atmosphere at a temperature of at least 650° C. develops a scale comprising a manganese-chromate spinel on at least a portion of a surface thereof, and (b) at least one gas flow channel that when subjected to an oxidizing atmosphere at a temperature of at least 650° C. develops an aluminum-rich oxide scale on at least a portion of a surface thereof, the aluminum-rich oxide scale comprising iron and chromium and having a hematite structure; the interconnect being formed from a ferritic stainless steel comprising from 0.2 to 4 weight percent manganese, from 0.3 to 1 weight percent aluminum, and at least one rare earth element, provided that the ferritic stainless steel comprises a total of at least 0.03 weight percent of rare earth elements.

Another non-limiting embodiment relates to an interconnect for solid oxide fuel cells comprising (a) at least one via comprising a scale comprising a manganese-chromate spinel on at least a portion of a surface thereof, and (b) at least one gas flow channel comprising an aluminum-rich oxide scale comprising iron and chromium and having a hematite structure on at least a portion of a surface thereof, the aluminum-rich oxide scale having a thickness less than 5 microns; the interconnect being formed from a ferritic stainless steel comprising from 0.2 to 4 weight percent manganese, from 0.3 to 1 weight percent aluminum, and at least one rare earth element, provided that the ferritic stainless steel comprises a total of at least 0.03 weight percent of rare earth elements.

Still another non-limiting embodiment relates to an interconnect for solid oxide fuel cells comprising (a) at least one via that when subjected to an oxidizing atmosphere at a temperature of at least 650° C. develops a scale comprising a manganese-chromate spinel on at least a portion of a surface thereof, and (b) at least one gas flow channel comprising at least one electropolished surface; the interconnect being formed from a ferritic stainless steel.

Yet other non-limiting embodiment relates to an interconnect for solid oxide fuel cells comprising (a) a fuel side; and (b) an oxidant side opposite the fuel side, the oxidant side comprising (1) at least one via that when subjected to an oxidizing atmosphere at a temperature of at least 650° C. develops a scale comprising a manganese-chromate spinel on at least a portion of a surface thereof, and (2) at least one gas flow channel that when subjected to an oxidizing atmosphere at a temperature of at least 650° C. develops an aluminum-rich oxide scale on at least a portion of a surface thereof, the aluminum-rich oxide scale comprising iron and chromium and having a hematite structure, wherein the oxidant side of the interconnect is formed from a ferritic stainless steel comprising from 0.2 to 4 weight percent manganese, from 0.3 to 1 weight percent aluminum, and at least one rare earth element, provided that the ferritic stainless steel comprises a total of at least 0.03 weight percent of rare earth elements.

Another non-limiting embodiment relates to an interconnect for solid oxide fuel cells, the interconnect comprising (a) an oxidant side formed from a ferritic stainless steel and comprising (1) at least one via, and (2) at least one gas flow channel comprising at least one surface that when subjected to an oxidizing atmosphere at a temperature of at least 650° C. develops an aluminum-rich oxide scale, the aluminum-rich oxide scale comprising iron and chromium and having a hematite structure; and (b) a fuel side opposite the oxidant side, the fuel side comprising a metallic material that forms an oxide having a dissociation pressure greater than a partial pressure of oxygen proximate the fuel side of the interconnect during operation of the solid oxide fuel cells.

Another non-limiting embodiment relates to an interconnect for solid oxide fuel cells, the interconnect comprising (a) an oxidant side formed from a ferritic stainless steel and comprising (1) at least one via comprising a scale comprising at least one of chromium oxide and manganese-chromate spinel on at least a portion of a surface thereof, and (2) at least one gas flow channel comprising an aluminum-rich oxide scale on at least a portion of a surface thereof, the aluminum-rich oxide scale comprising iron and chromium and having a hematite structure; and (b) a fuel side opposite the oxidant side, the fuel side comprising a metallic material that forms an oxide having a dissociation pressure greater than a partial pressure of oxygen proximate the fuel side of the interconnect during operation of the solid oxide fuel cells.

Other non-limiting embodiments relate to methods of making interconnects for use with solid oxide fuel cells. For example, one non-limiting embodiment relates to a method of making an interconnect comprising (a) forming an interconnect from a ferritic stainless steel, the interconnect having a fuel side and an oxidant side opposite the fuel side, each of the oxidant side and fuel side comprising a via and a gas flow channel; and (b) selectively electropolishing at least a portion of at least one gas flow channel of the oxidant side of the interconnect.

Another non-limiting embodiment relates to a method of making an interconnect comprising (a) forming an interconnect from a ferritic stainless steel, the interconnect comprising a via and a gas flow channel; (b) electropolishing at least at least the oxidant side of the interconnect; and (c) physically or chemically removing material from at least one electropolished surface of at least one via of the oxidant side of the interconnect.

Yet another non-limiting embodiment relates to a method of making an interconnect comprising (a) connecting a metallic material on at least a portion of a surface of a ferritic stainless steel sheet material, the metallic material being nickel or a nickel alloy, copper or a copper alloy, or a nickel-copper alloy; (b) forming an interconnect from the ferritic stainless steel sheet material, the interconnect having an oxidant side comprising ferritic stainless steel and a fuel side opposite the oxidant side comprising the metallic material, each of the oxidant side and the fuel side of the interconnect comprising a via and a gas flow channel; and (c) electropolishing at least a portion of at least one gas flow channel of the oxidant side of the interconnect.

Still another non-limiting embodiment relates to a method of making an interconnect comprising (a) forming an interconnect from a ferritic stainless steel sheet material, the interconnect having an oxidant side and a fuel side opposite the oxidant side, each of the oxidant side and the fuel side of the interconnect comprising a via and a gas flow channel; (b) electropolishing at least a portion of at least one gas flow channel of the oxidant side of the interconnect; and (c) connecting a metallic material to at least a portion of a surface of the fuel side of the interconnect, the metallic material being nickel or a nickel alloy, copper or a copper alloy, or a nickel-copper alloy.

Other non-limiting embodiments relate to planar solid oxide fuel cells including the interconnects according to various non-limiting embodiments disclosed herein.

BRIEF DESCRIPTION OF THE DRAWINGS

Various non-limiting embodiments described herein may be better understood when read in conjunction with the drawings, in which:

FIGS. 8b-8e are characteristic x-rays maps for chromium, iron, aluminum, and manganese, respectively, obtained from the same area shown in FIG. 8a.

DETAILED DESCRIPTION

Figure 1:
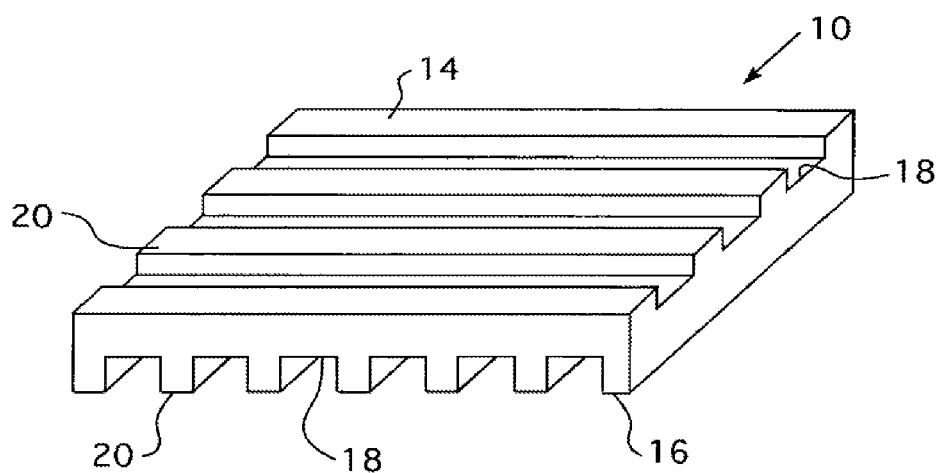
FIG. 1 is a schematic perspective view of an interconnect for SOFCs.

As used in this specification and the appended claims, the articles "a," "an," and "the" include plural referents unless expressly and unequivocally limited to one referent. Additionally, for the purposes of this specification, unless otherwise indicated, all numbers expressing quantities, such as weight percentages and processing parameters, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique.

As discussed above, stainless steels, and in particular ferritic stainless steels, have been considered as possible cost-effective replacement materials for SOFC interconnects. However, the environmental conditions proximate both the anode and the cathode of an operational SOFC may cause oxidation of most iron-chromium ("Fe—Cr") containing stainless steels. Since an oxidized interconnect is generally a less efficient electrical current conductor than a non-oxidized interconnect, the efficiency of the fuel cell stack as a whole may decrease over time as the oxide scale on the interconnects within the fuel cell increases in thickness. The inherent limitations of current generation metallic interconnects has limited available SOFC and PSOFC designs to relatively inefficient, low temperature operation (approximately 700° C. (1292° F.)) in order to prevent excessive oxidation on the interconnect surfaces.

As used herein the term "interconnect" means a device that connects (electrically and/or mechanically) one component to another component. Further, although not required, the interconnects according to the various non-limiting embodiments disclosed herein may also serve to separate and/or direct the flow of the gaseous reactants used during operation of a SOFC. For example, as previously discussed, immediately adjacent SOFCs in a PSOFC are typically connected together by an interconnect that is interposed between the cathode of one SOFC and the anode of an immediately adjacent SOFC, provides electrical interconnection between the SOFCs, and serves to separate and direct the flow of gaseous reactants. The interconnects according to various non-limiting embodiments disclosed herein may also be used to connect an SOFC of one PSOFC to the SOFC of another PSOFC. For example, the interconnects according to various non-limiting embodiments disclosed herein can form the "end plate" of a PSOFC and can serve to electrically and/or mechanically connect that PSOFC to an adjacent PSOFC or, alternatively, to another component in the system.

Figure 2:
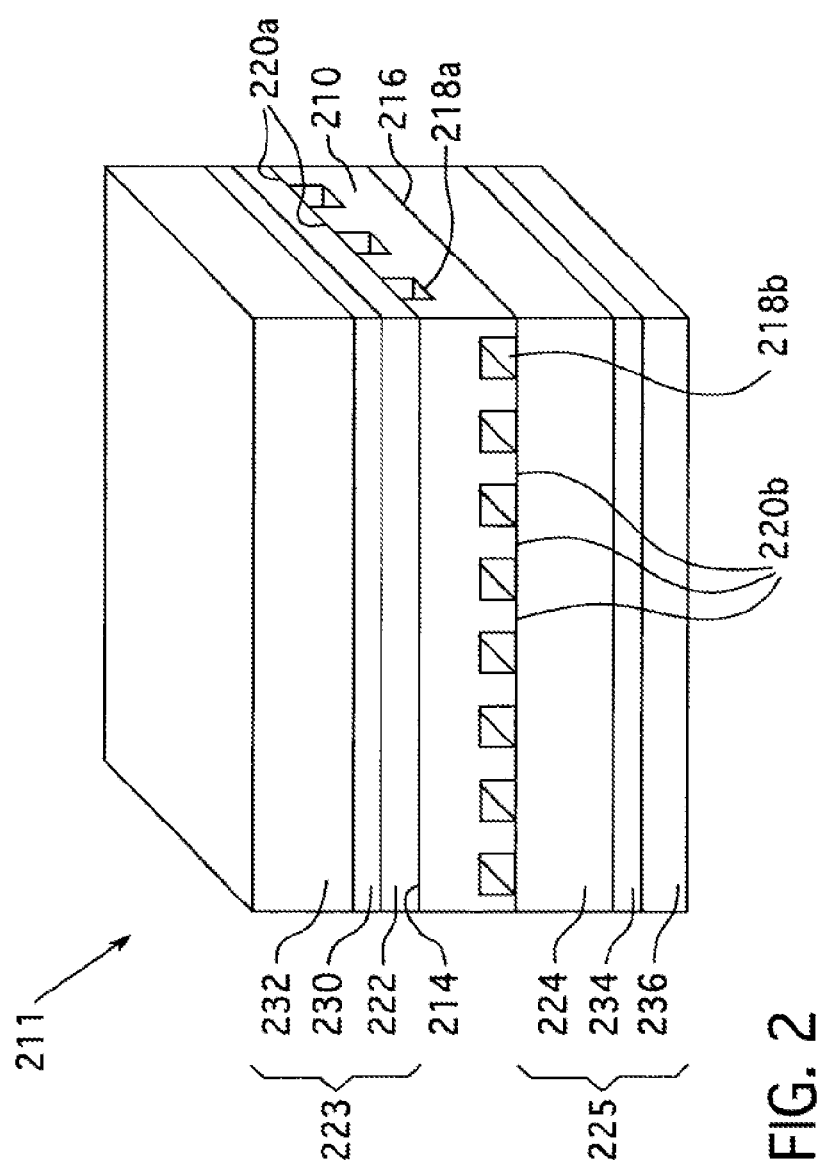
FIG. 2 is a schematic, perspective view of a PSOFC, including an interconnect.

Referring now to FIG. 1, there is shown a schematic perspective view of an interconnect (generally indicated as 10 in FIG. 1) having a typical configuration for use in current generation PSOFCs. It will be appreciated by those skilled in the art that the precise design of an interconnect will depend upon the design of the PSOFC and the individual SOFCs involved. Accordingly, the interconnect configuration shown in FIG. 1 is not intended to limit the possible configurations of the interconnects according to the invention, but is provided for illustration purposes only. As shown in FIG. 1, interconnect 10 has a first side 14 and a second side 16 opposite the first side. Both the first and second sides have at least one gas flow channel 18 and at least one via 20. As used herein the term "via" means an electrically conductive pathway. When positioned in a PSOFC between two adjacent SOFC, the vias on one side of the interconnect make electrical contact with an electrode of one of the SOFCs in the stack, while the vias on the opposite side of the interconnect make electrical contact with an oppositely charged electrode of an adjacent SOFC in the stack, permitting the flow of current from one SOFC to the next. For example, as shown in FIG. 2, interconnect 210 of the PSOFC (generally indicated as 211) is positioned such that the vias 220a on side 214 of interconnect 210 are adjacent cathode 222 of one SOFC (generally indicates as 223), while the vias 220b on side 216 of interconnect 210 are adjacent anode 224 of an adjacent SOFC (generally indicated as 225) in the stack. As shown in FIG. 2, SOFC 223 includes cathode 222, electrolyte 230 and anode 232, and SOFC 225 includes anode 224, electrolyte 234 and cathode 236.

With continued reference to FIG. 2, during operation of a PSOFC, gases flows through the gas flow channels 218a, 218b on both sides (214, 216) of the interconnect 210. The gas flowing through the gas flow channels 218 on side 216 of the interconnect 210, which is adjacent anode 224, is a fuel-rich gas, for example a hydrogen-rich gas; while the gas flowing through the gas flow channels 218 on side 214 adjacent cathode 222 is an oxidant-rich gas, typically air. Thus, side 214 of interconnect 210 is exposed to the oxygen-rich environment near cathode 222 during operation of the PSOFC, and side 216 is exposed to the fuel-rich environment near anode 224 during operation of the PSOFC. As used herein with reference to the interconnect, the term "oxidant side" refers to the side of an interconnect that is or will be adjacent the cathode of a SOFC during operation of a PSOFC into which it is incorporated, for example, side 214 in FIG. 2. Further, as used herein with reference to the interconnect, the term "fuel side" refers to the side of an interconnect that is or will be adjacent the anode of a SOFC during operation of a PSOFC into which it is incorporated, for example, side 216 in FIG. 2.

Interconnects according to various non-limiting embodiments disclosed herein will now be described. One non-limiting embodiment provides an interconnect for SOFCs, the interconnect being formed from a ferritic stainless steel and comprising at least one via that when subjected to an oxidizing atmosphere at a temperature of at least 650° C. develops a scale comprising a manganese-chromate spinel on at least a portion of a surface thereof, and at least one gas flow channel that when subjected to an oxidizing atmosphere at a temperature of at least 650° C. develops an aluminum-rich oxide scale on at least a portion of a surface thereof, the aluminum-rich oxide scale comprising iron and chromium and having a hematite structure. As used herein the term "scale" refers to oxidation products at or on the surface of a material.

As previously discussed, ferritic stainless steels have been considered for use in SOFC interconnect applications largely due to their ability to form an electrically conductive, chromium-rich oxide scale when exposed to an oxidizing atmosphere (such as that seen during operation of an SOFC) and their relatively low CTEs. However, one drawback to the utilization of ferritic stainless steels in SOFC interconnect applications is the potential for poisoning of the porous electrodes, and in particular the cathodes, used in the SOFC due to chromium migration (e.g., the evolution of chromium-bearing vapor species and/or solid state chromium diffusion) from the chromium-rich oxide scale that forms during operation of the SOFC. As previously discussed, because water vapor is often present in the gas streams of an operational SOFC, the formation of volatile chromium-oxy hydroxides, particularly in gas flow channels of an interconnect, may exacerbate this problem.

In contrast to chromium-rich oxide scales, aluminum-rich oxide scales are essentially unaffected by the water vapor present in the gas streams of the operational SOFC. Further, the formation of an aluminum-rich oxide scale on the surface of a ferritic stainless steel may reduce or prevent chromium migration from the surface of the ferritic stainless steel during operation of a SOFC. However, since aluminum-rich oxide scales have a high electrical resistivity, the formation of aluminum-rich oxide scales on electrical contact surfaces (for example, via surfaces) is generally not desirable. While a scale comprising manganese-chromate spinel can form on the surface of some stainless steels and is a reasonably good electrical conductor, as previously discussed, if sufficient chromium is present in the scale, chromium migration leading to cathode poisoning may still occur.

Although not meaning to be bound by any particular theory, it is contemplated that by selectively treating at least the surfaces of the gas flow channels of the interconnects according to various non-limiting embodiments disclosed herein such that an aluminum-rich oxide scale may form on at least a portion of the treated surfaces when subjected to an oxidizing atmosphere at a temperature of at least 650° C., chromium migration from those surfaces can be reduced without detrimentally effecting the ASR of the interconnect. That is, since the surfaces of the gas flow channels are not in direct electrical contact with adjacent electrodes (for example as shown in FIG. 2), the formation of an aluminum-rich oxide scale on the surfaces of the gas flow channels should not detrimentally effect the ASR of the interconnect. However, since the regions of the interconnect that are most prone to the formation of chromium-bearing vapor species are the gas flow channels, in part due to the high water vapor content of the gases flowing therethrough, it is contemplated that the formation of an aluminum-rich oxide scale on these surfaces may reduce the amount and/or rate of formation of chromium-bearing vapor species from these surfaces during operation of a SOFC, which may in turn reduce the occurrence of cathode poisoning.

According to various non-limiting embodiments disclosed herein, wherein the gas flow channel comprises at least one surface that when subjected to an oxidizing atmosphere at a temperature of at least 650° C. develops an aluminum-rich oxide scale, the interconnect may be formed from a Fe—Cr ferritic stainless steel comprising a sufficient alloy content to permit the formation of the aluminum-rich oxide scale. For example, according to various non-limiting embodiments, the interconnect may be formed from a ferritic stainless steels comprising from 0.3 to 1 weight percent aluminum, and at least one rare earth element (such as, but not limited to, cerium, lanthanum, and praseodymium), provided that the ferritic stainless steel comprises a total of at least 0.03 weight percent of rare earth elements. Further, to allow for the formation of a scale comprising a manganese-chromate spinel on at least a portion of a surface of a via (as discussed above), according to various non-limiting embodiments, the ferritic stainless steel may further comprise from 0.2 to 4 weight percent manganese.

One specific non-limiting example of a ferritic stainless steel comprising from 0.2 to 4 weight percent manganese, from 0.3 to 1 weight percent aluminum and at least 0.03 weight percent of rare earth elements that can be used in conjunction with various non-limiting embodiments disclosed herein is a ferritic stainless steel comprising from 0.002 to 0.1 weight percent carbon, from 21 to 35 weight percent chromium, from 0.2 to 4 weight percent manganese, from 0.3 to 0.5 weight percent aluminum, from 0 to 0.05 weight percent lanthanum, from 0 to 0.1 weight percent cerium, and iron and impurities, provided that a sum of the weight percent lanthanum and the weight percent cerium is at least 0.03.

Another non-limiting example of a ferritic stainless steel comprising from 0.2 to 4 weight percent manganese, from 0.3 to 1 weight percent aluminum and at least 0.03 weight percent rare earth elements that can be used in conjunction with various non-limiting embodiments disclosed herein is a ferritic stainless steel comprising from 0.002 to 0.1 weight percent carbon, from 0 to 0.03 weight percent nitrogen, from 21 to 24 weight percent chromium, from 0 to 0.3 weight percent nickel, from 0 to 0.4 weight percent molybdenum, from 0.2 to 0.5 weight percent manganese, from 0.5 to 0.8 weight percent aluminum, from 0 to 0.5 weight percent silicon, from 0 to 0.02 weight percent niobium, from 0 to 0.01 weight percent titanium, from 0.008 to 0.02 weight percent lanthanum, cerium, iron and impurities, wherein the sum of the weight percent lanthanum and the weight percent cerium ranges from 0.03 to 0.06 weight percent. One commercially available, non-limiting example of such a ferritic stainless steel is AL 453™ ferritic stainless steel alloy, which is available from Allegheny Ludlum Corporation of Pittsburgh, Pa.

Alternatively, and as discussed below in more detail, if only one side of the interconnect (for example the oxidant side) comprises a gas flow channel comprising at least one surface that when subjected to an oxidizing atmosphere at a temperature of at least 650° C. develops an aluminum-rich oxide scale, that side or portion of the interconnect may be formed form a ferritic stainless steel having sufficient alloy content to permit the formation of an aluminum-rich oxide scale, while the other opposite side of the interconnect (for example the fuel side) may be formed from a ferritic stainless steel comprising less than 0.3 weight percent aluminum. Non-limiting examples of ferritic stainless steels comprising less than 0.3 weight percent aluminum are set forth below in more detail.

As previously discussed, the interconnects according to various non-limiting embodiments disclosed herein can comprise at least one gas flow channel that when subjected to an oxidizing atmosphere at a temperature of at least 650° C. develops an aluminum-rich oxide scale on at least a portion of a surface thereof. Further, according to various non-limiting embodiment, the aluminum-rich oxide scale may comprise iron and chromium. More particularly, according to various non-limiting embodiments disclosed herein, the aluminum-rich oxide scale may comprise aluminum, iron, chromium and oxygen (wherein at least a portion of the iron and chromium cations replace a portion of the aluminum cations in the aluminum oxide lattice structure, and may have a hematite structure. More specifically, the hematite structure may have lattice parameters $a_0$ and $c_0$, wherein $a_0$ ranges from 4.95 Angstroms (Å) (i.e., $10^{-10}$ m) to 5.04 Å and $c_0$ ranges from 13.58 Å to 13.75 Å.

In contrast to Fe—Cr—Al ferritic stainless steels, which typically contain from 3 weight percent to 7 weight percent aluminum, typical Fe—Cr ferritic stainless steels do not develop an aluminum-rich oxide scale on their surface when oxidized. That is, generally when typical Fe—Cr ferritic stainless steels, which contain only residual levels of aluminum (e.g., 0.3 to 0.5 weight percent), are exposed to an oxidizing atmosphere, the Fe—Cr ferritic stainless steel tends to form a chromium-rich oxide scale on its surface. Further, depending upon the composition of the ferritic stainless steel, a scale comprising a manganese-chromate spinel may form on at least a portion of the ferritic stainless steel. However, the inventors herein have discovered that by electropolishing certain Fe—Cr ferritic stainless steels that contain levels of aluminum, which are otherwise insufficient to produce a native aluminum-rich oxide scale on their surface during oxidation, an aluminum-rich oxide scale can be developed on the Fe—Cr ferritic stainless steel when it is exposed to an oxidizing atmosphere at a temperature of at least 650° C.

Further, the inventors herein have discovered that the effects of electropolishing Fe—Cr ferritic stainless steels may be reduced or eliminated, for example, by removing material from the electropolished surface. Accordingly, when exposed to an oxidizing atmosphere at a temperature of at least 650° C., those regions of the ferritic stainless steel that have either not been electropolished or from which the effects of electropolishing have been removed can develop a scale comprising a chromium-rich oxide and/or a manganese-chromate spinel on their surfaces.

For example, although not limiting herein, it has been observed by the inventors that, after electropolishing, Fe—Cr ferritic stainless steels containing from 0.3 to 1 weight percent aluminum and at least 0.03 weight percent of rare earth element(s), may form an aluminum-rich oxide scale on exposure to oxidizing conditions (such as those seen during operation of a PSOFC). Further, as discussed above, while the formation of an aluminum-rich oxide scale on certain regions of an interconnect may be advantageous in reducing the rate of cathode poisoning due to chromium migration from those regions, because aluminum-rich oxides scales have a high electrical resistivity, the presence of such a scale on the via surfaces of the interconnect can lead to an increase in ASR and degrade the electrical properties of the interconnect. Therefore, according to certain non-limiting embodiments disclosed herein, the interconnect may be treated so as to permit the formation of an aluminum-rich oxide scale on certain surfaces of the interconnect, such as but not limited to, the gas flow channel surfaces, manifold surfaces and/or sealing flange surfaces, while preventing the formation of an aluminum-rich oxide scale on other surfaces, such as the via surfaces. For example, one non-limiting embodiment provides an interconnect for SOFCs, the interconnect being formed from a ferritic stainless steel and comprising at least one via that when subjected to an oxidizing atmosphere at a temperature of at least 650° C. develops a scale comprising a manganese-chromate spinel on at least a portion of a surface thereof, and at least one gas flow channel comprising at least one electropolished surface. As used herein the term "manifold" refers to the portion(s) of the interconnect that connect the gas flow channels on the oxidant side and the fuel side of the interconnect to the air and fuel gas supplies, respectively. Further, as used herein the term "sealing flange" refers to the portions of the interconnect, generally at the out perimeter of the interconnect to which a sealing compound such as, but not limited to, an alkaline glass, is applied to create a gas-tight seal for the PSOFC.

In another non-limiting embodiment, the surfaces of the sealing flange of the interconnect may also be electropolished to both reduce chromium migration from those surfaces and to provide an electrically insulating surface in the sealing area. Although not limiting herein, it is contemplated that by providing an electrically insulating surface at the sealing flange of the interconnect a variety of sealing compounds, including both electrically insulating and electrically conductive sealing compounds, may be employed.

As used herein, the terms "electropolishing" and "electropolished" refer to the electrochemical removal of material from at least a portion of a work piece. For example, according to one non-limiting embodiment, the entire interconnect can be electropolished, and thereafter, selected surfaces (such as, for example, via surfaces) of the electropolished interconnect can be mechanically or chemically polished, ground, etched and/or milled to remove or abrade material from the selected surfaces, thereby reducing or eliminating the effect of electropolishing on those surfaces (as discussed above).

According to other non-limiting embodiments, the interconnect can be subjected to a selective electropolishing treatment such that material is electrochemically removed from at least a portion of gas flow channel surfaces, while essentially no material is electrochemically removed from the via surfaces. As used herein, the terms "selective electropolishing" refers to the electrochemical removal of material from one or more pre-selected portions or regions of a work piece. Further, as used herein with reference to various portions of an interconnect, the term "selectively electropolished" refers to those pre-selected portions of the interconnect from which material is electrochemically removed. Methods of selectively electropolishing are discussed herein below in more detail.

As discussed above, during operation of an SOFC, the ferritic stainless steel interconnects according to various non-limiting embodiments disclosed herein will undergo oxidation such that the interconnect will comprise a scale comprising a manganese-chromate spinel on at least a portion of a surface of at least one via and an aluminum-rich oxide scale on at least a portion of a surface of at least one gas flow channel. The thickness of these various scales will depend on several factors, for example the steel composition, exposure time, operating temperature, humidity and gas composition. Although not limiting herein, according to certain embodiments, the scale comprising manganese-chromate spinel may have a thickness of less than 10 microns, and the aluminum-rich oxide scale may have a thickness that is less than 5 microns. Further according to various non-limiting embodiments disclosed herein, the thickness of the aluminum-rich oxide scale may range from 1 micron to less than 5 microns, and may further range from 2 microns to 3 microns.

Other non-limiting embodiments disclosed herein provide an interconnect for SOFCs, the interconnect comprising a fuel side and an oxidant side opposite the fuel side, the oxidant side of the interconnect being formed from a ferritic stainless steel and comprising at least one via that when subjected to an oxidizing atmosphere at a temperature of at least 650° C. develops a scale comprising a manganese-chromate spinel on at least a portion of a surface thereof and at least one gas flow channel that when subjected to an oxidizing atmosphere at a temperature of at least 650° C. develops an aluminum-rich oxide scale on at least a portion of a surface thereof, the aluminum-rich oxide scale comprising iron and chromium and having a hematite structure. For example, according to this non-limiting embodiment, at least the oxidant side of the interconnect can be formed from a ferritic stainless steel comprising from 0.2 to 4.0 weight percent manganese, from 0.3 to 1.0 weight percent aluminum, and at total of at least 0.03 weight percent of rare earth element(s). Further, according to this non-limiting embodiment at least a portion of at least one surface of the gas flow channel of the oxidant side of the interconnect can be electropolished or selectively electropolished.

As previously discussed, typical interconnects for use in SOFCs have a fuel side and an oxidant side, each of which comprise vias that permit flow of electrical charge between adjacent SOFCs in a PSOFC, as well as gas flow channels that provide a passageway for transport of a gas on either side of the interconnect. Thus, according to this and other non-limiting embodiments disclosed herein, the fuel side of the interconnect can be formed from a ferritic stainless steel and can comprise at least one gas flow channel comprising at least one surface that when subjected to an oxidizing atmosphere at a temperature of at least 650° C. develops an aluminum-rich oxide scale. For example, according to this non-limiting embodiment, the fuel side of the interconnect can be formed from a ferritic stainless steel comprising from 0.2 to 4.0 weight percent manganese, from 0.3 to 1 weight percent aluminum and a total of least 0.03 weight percent of rare earth element(s). Further, according to this non-limiting embodiment, at least a portion of the at least one gas flow channel of the fuel side can be electropolished or selectively electropolished. Additionally, according to this non-limiting embodiment, the fuel side of the interconnect can comprise at least one via that develops a scale comprising a manganese-chromate spinel on at least a portion of a surface thereof when exposed to an oxidizing atmosphere at a temperature of at least 650° C.

Figure 3A:
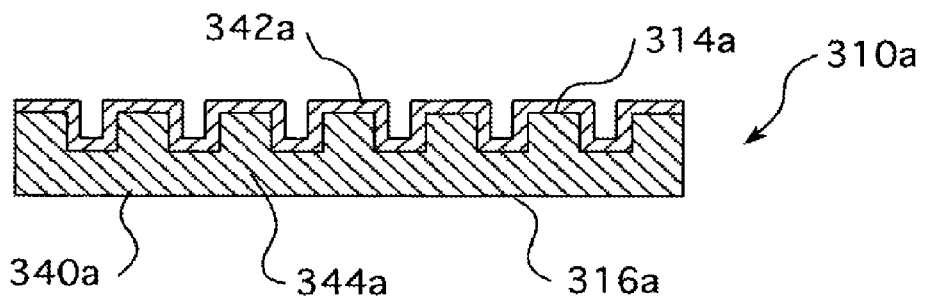
FIGS. 3a, 3b, and 3c are schematic, cross-sectional views of interconnects according to various non-limiting embodiments disclosed herein.
Figure 3B:
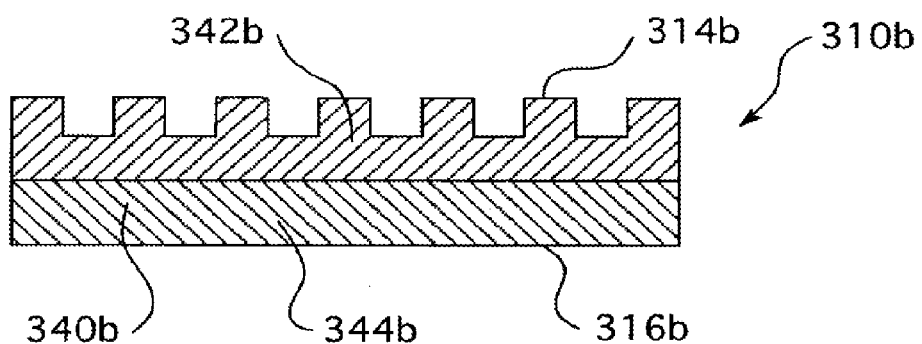

Alternatively, according to this and other non-limiting embodiments disclosed herein, the fuel side of the interconnect may be formed from a ferritic stainless steel (which may be the same as or different from the ferritic stainless steel which forms the oxidant side of the interconnect) and may comprises a layer comprising a metallic material that forms an oxide having a dissociation pressure greater than a partial pressure of oxygen proximate the fuel side of the interconnect during operation of the SOFC connected to at least a portion of the ferritic stainless steel (for example, as shown in FIG. 3a, which is discussed below in more detail). Still further, the fuel side of the interconnect according to this and other non-limiting embodiments disclosed may be formed from a metallic material that forms an oxide having a dissociation pressure greater than a partial pressure of oxygen proximate the fuel side of the interconnect during operation of the SOFC and connected to the oxidant side of the interconnect (for example, as shown in FIG. 3b, which is discussed below in more detail).

For example, one non-limiting embodiment provides an interconnect for SOFCs, the interconnect comprising an oxidant side formed from a ferritic stainless steel and comprising a via (which may develop a scale comprising at least one of chromium oxide and manganese-chromate on at least a portion of a surface thereof when subjected to an oxidizing atmosphere at a temperature of at least 650° C.), and a gas flow channel, the gas flow channel comprising at least one surface that when subjected to an oxidizing atmosphere at a temperature of at least 650° C. develops an aluminum-rich oxide scale, and a fuel side opposite the oxidant side, the fuel side comprising a metallic material that forms an oxide having a dissociation pressure greater than a partial pressure of oxygen proximate the fuel side of the interconnect during operation of the SOFCs. For example, according to this non-limiting embodiment, the fuel side of the interconnect can be formed from a ferritic stainless steel, which may be the same as or different from the ferritic stainless steel of the oxidant side, and may comprise a layer comprising a metallic material that forms an oxide having a dissociation pressure greater than the partial pressure of oxygen proximate the fuel side of the interconnect during operation of the SOFCs that is connected to the ferritic stainless steel of the fuel side. For example, a layer comprising the metallic material may be plated or clad to a portion of a ferritic stainless steel that forms the fuel side of the interconnect. Alternatively, the fuel side of the interconnect can be formed from the metallic material that forms an oxide having a dissociation pressure greater than a partial pressure of oxygen proximate the fuel side of the interconnect during operation of the SOFCs.

Another non-limiting embodiment provides an interconnect for SOFCs, the interconnect comprising an oxidant side formed from a ferritic stainless steel and comprising at least one via comprising a scale comprising a manganese-chromate spinel on at least a portion of a surface thereof, and at least one gas flow channel comprising an aluminum-rich oxide scale on at least a portion of a surface thereof; and a fuel side opposite the oxidant side, the fuel side comprising a metallic material that forms an oxide having a dissociation pressure greater than a partial pressure of oxygen proximate the fuel side of the interconnect during operation of the SOFCs.

Still another non-limiting embodiment provides an interconnect for SOFCs comprising a gas-impermeable body, the gas-impermeable body being formed from a ferritic stainless steel and including a fuel side comprising a via and a gas flow channel, and an oxidant side opposite the fuel side, the oxidant side comprising a via and a gas flow channel, wherein a metallic material that forms an oxide having a dissociation pressure greater than a partial pressure of oxygen proximate the fuel side of the interconnect during operation of the SOFCs is connected to at least a portion of the ferritic stainless steel on fuel side of the body.

Referring again to FIG. 2, as previously discussed, in a typical PSOFC, an oxidant is introduced proximate a cathode 222 of one SOFC, and a fuel is introduced proximate an anode 224 of an adjacent another SOFC in the PSOFC. While in current generation SOFCs the $pO_2$ proximate the oxidant side of the interconnect is typically greater than $10^{-3}$ atmospheres, the $pO_2$ proximate the fuel side of an interconnect is substantially lower and may vary depending upon factors such as the fuel type, fuel utilization level, and operating temperature of the PSOFC.

Figure 4:
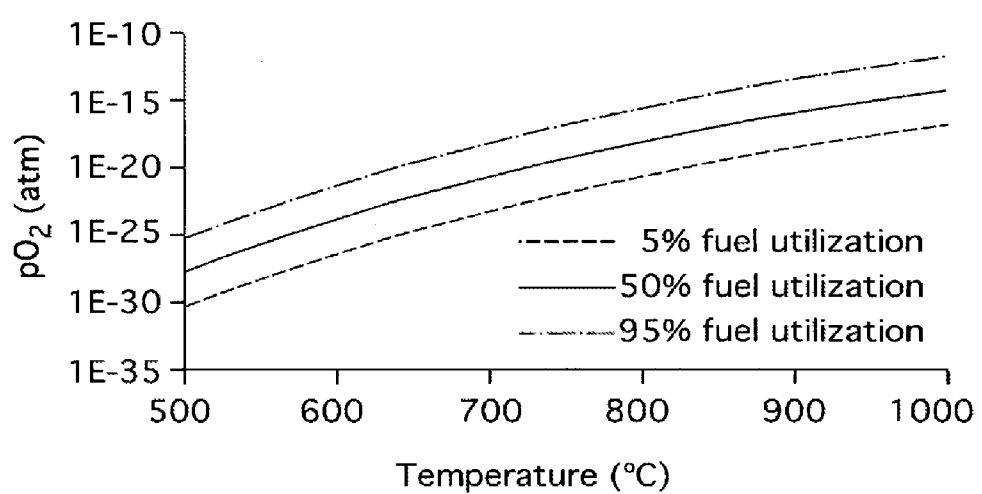
FIG. 4 is a graph illustrating the variation in oxygen partial pressure versus operating temperature for various fuel utilization levels in a conventional PSOFC.

Referring now to FIG. 4, there is shown a graph illustrating the variation in $pO_2$ levels on the fuel side of a typical current generation SOFC operating at temperatures ranging from 500° C. to 1000° C., at three different fuel utilization levels (5%, 50% and 95%) using pure hydrogen fuel (it should be appreciated, however, variations in $pO_2$ levels on the fuel side of a typical current generation SOFC similar to that shown in FIG. 4 will occur when other fuel types, for example natural gas, are employed). As illustrated in FIG. 4, the $pO_2$ on the fuel side of an interconnect can vary from about $10^{-30}$ atmospheres to greater than $10^{-15}$ atmospheres, depending in part on the fuel utilization level and operating temperature employed. As previously discussed, at the operating temperatures commonly employed in current generation SOFCs, both stainless steel and most commonly used metal conductors will oxidize when exposed to $pO_2$ levels such as those proximate the oxidant side of an interconnect. Further, as previously discussed, stainless steels will also generally oxidize when exposed to $pO_2$ levels such as those proximate the fuel side of an interconnect during operation of a current generation SOFC. However, since as compared to most commonly used metal conductors, stainless steel forms relatively slow growing and electrically conductive chromium oxide scale on its surface, stainless steels have attracted interest for use in forming interconnects for SOFCs. It will be appreciated by those skilled in the art that the variation in $pO_2$ on the fuel side a particular SOFC will depend upon several factors, including without limitation, the design of the SOFC. Accordingly, FIG. 4 is intended for illustration purposes only and is not intended to limit the scope of the invention.

Figure 5:
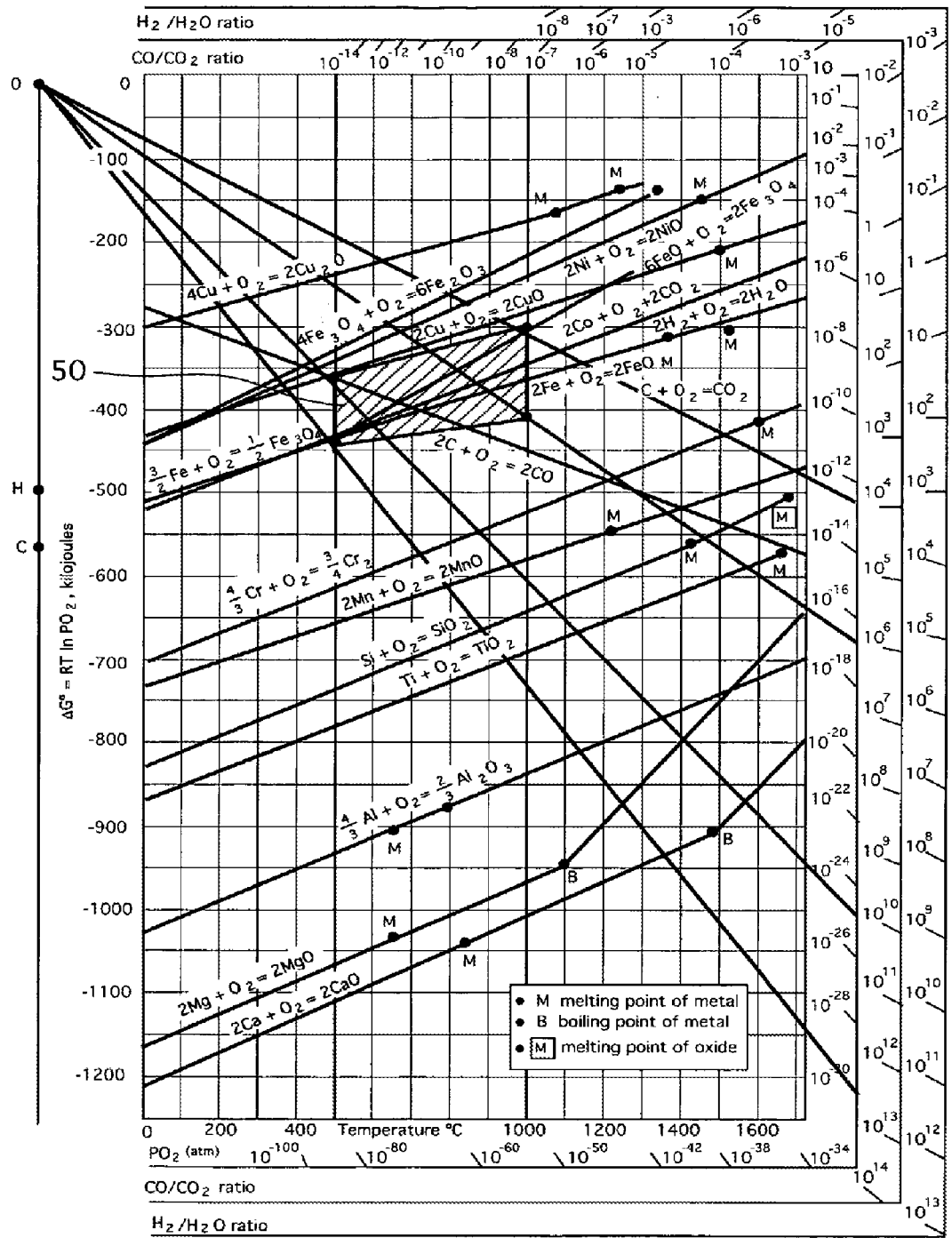
FIG. 5 is an Ellingham diagram on which certain operating conditions (i.e., temperature and pO2) proximate the fuel side of an interconnect during operation of a typical planar solid oxide fuel cell are generally indicated.

Referring now to FIG. 5, there is shown an Ellingham Diagram on which the conditions proximate the fuel side of a typical, current generation SOFC operating at fuel utilization levels of 5% and 95% and temperatures of 500° C. and 1000° C. (which correlate to the $pO_2$ values as shown above in FIG. 4) are highlighted. Metals that form an oxide having a dissociation pressure that is greater than the $pO_2$ proximate the fuel side of an interconnect under the typical operating conditions (highlighted by box 50 in FIG. 5) are those metals that have an Ellingham line (i.e., the equilibrium line for oxide formation) between 500° C. and 1000° C. that lies completely outside and above box 50—for example, metals such as copper, nickel, and cobalt. Iron, which has an Ellingham line that intersects box 50, forms an oxide that has a dissociation pressure that is greater than the $pO_2$ proximate the fuel side of the interconnect under some conditions, but less than the $pO_2$ proximate the fuel side under other conditions. Chromium, which has an Ellingham line that lies completely outside and below box 50, forms an oxide having a dissociation pressure that is less than the $pO_2$ proximate the fuel side of the model interconnect under all the typically operating conditions indicated in FIG. 5. Accordingly, it is expected that chromium will oxidize when exposed to the conditions proximate the fuel side of an interconnect during operation of a typical current generation SOFC. It will be appreciated by those skilled in the art that the actual operating envelope for a given SOFC will depend upon several factors, including without limitation, the operating temperature, fuel utilization level, and fuel type employed. Accordingly, FIG. 5 is intended for illustration purposes only and is not intended to limit the scope of the invention.

While Fe—Cr ferritic stainless steels tend to oxidize when exposed to the $pO_2$ levels near both the anode of a SOFC and the cathode of a SOFC during operation of the PSOFC (as indicated above in FIG. 5) some metals will not oxidize when exposed to the environment proximate the anode of the SOFC. Further, since the electrical resistivity of metals, such as but not limited to copper, nickel and copper-nickel alloys, is generally lower than the electrical resistivity of the chromium oxide scale that forms on a ferritic stainless steel interconnect during operation of the SOFCs, by employing a combination of a ferritic stainless steel (which is optionally electropolished as discussed herein) and a metallic material that forms an oxide having a dissociation pressure greater than the $pO_2$ proximate the fuel side of the interconnect during operation of the SOFCs, the oxidation properties of the interconnects according to various non-limiting embodiments disclosed herein may be tailored to the environmental conditions experienced by the interconnect during operation of the SOFCs.

For example, as shown in FIG. 3a, although not limiting herein, the interconnect (generally indicated as 310a) may comprises a body 340a that is formed from a ferritic stainless steel 344a and that is gas-impermeable, so as to separate the fuel and oxidant gases flowing on fuel side 314a and the oxidant side 316a of interconnect 310a, respectively. Further, according to this non-limiting example, a metallic material 342a that forms an oxide having a dissociation pressure greater than a partial pressure of oxygen proximate the fuel side 314a of the interconnect 310a during operation of the solid oxide fuel cells may be connected to at least a portion of the ferritic stainless steel 344a on fuel side 314a of the body 340a to reduce or prevent contact between the fuel gas and the ferritic stainless steel. For example, according to one non-limiting embodiment, metallic material 342a may be present as a gas-impermeable or solid layer that is bonded to the ferritic stainless steel 344a on the fuel side 314a of the body 340a. Methods of forming such a layer include, but are not limited to, plating and cladding.

Alternatively, according to another non-limiting embodiment, the fuel side of the interconnect can be formed from a metallic material that forms an oxide having a dissociation pressure that is greater than a partial pressure of oxygen proximate the fuel side of the interconnect during operation of the SOFCs. For example, as shown in FIG. 3b, one non-limiting embodiment provides an interconnect (generally indicated as 310b) for SOFCs comprising a composite body 340b, the composite body comprising an oxidant side 316b formed from a ferritic stainless steel 344b and a fuel side 314b opposite the oxidant side, the fuel side being formed from a metallic material 342b that forms an oxide having a dissociation pressure greater than a partial pressure of oxygen proximate the fuel side of the interconnect during operation of the solid oxide fuel cells. According to this non-limiting example, body 340b may be gas-impermeable as previously discussed to provide for separation of the gaseous reactants.

According to various non-limiting embodiments disclosed herein, the metallic material that forms an oxide having a dissociation pressure that is greater than the partial pressure of oxygen proximate the fuel side of the interconnect may be selected from at least one of nickel and nickel alloys, copper and copper alloys, iron and iron alloys, cobalt and cobalt alloys, gold and gold alloys, and platinum and platinum alloys. According to certain non-limiting embodiments, the metallic material may be nickel or a nickel alloy, copper or a copper alloy, or a nickel-copper alloy. As used herein the term "nickel alloy" means an alloy that contains nickel as its major component on a per element basis. As used herein the term "copper alloy" means an alloy that contains copper as its major component on a per element basis. Further, as used herein the term "nickel-copper alloy" means an alloy that contains essentially equal amounts of nickel and copper, and nickel and copper are the major components of the alloy on a per element basis. For example, according to one non-limiting embodiment the metallic material may be a nickel alloy comprising up to 49 weight percent copper, up to 49 weight percent iron, and nickel. One non-limiting example a suitable nickel alloy is AL 400 alloy (generally designated UNS-N04400), which is commercially available from Allegheny Ludlum Corporation of Pittsburgh, Pa. USA, and has a typical composition of 0.10 weight percent carbon, 0.50 weight percent manganese, 0.005 weight percent phosphorus, 0.005 weight percent sulfur, 0.25 weight percent silicon, 0.02 weight percent aluminum, 32 weight percent copper, 1 weight percent iron, the balance being nickel and impurities.

According to other non-limiting embodiments, the metallic material that forms an oxide having a dissociation pressure that is greater than the partial pressure of oxygen proximate the fuel side of the interconnect may be a metallic material that forms an oxide having a dissociation pressure greater than at least $10^{-30}$ atmospheres at a temperature ranging from 500° C. to 1000° C. or can be metallic material that forms an oxide having a dissociation pressure greater than $10^{-25}$ atmospheres at a temperature ranging from 500° C. to 1000° C.

Optionally, although not shown in FIGS. 3a and 3b, the side of the interconnect opposite the metallic material (i.e., the oxidant side of the interconnect) can comprise at least one via that when subjected to an oxidizing atmosphere at a temperature of at least 650° C. develops a scale comprising a manganese-chromate spinel on at least a portion of a surface thereof, and at least one gas flow channel that when subjected to an oxidizing atmosphere at a temperature of at least 650° C. develops an aluminum-rich oxide scale on at least a portion of a surface thereof, wherein the aluminum-rich oxide scale comprises iron and chromium and has a hematite structure. For example, according to this non-limiting embodiment, at least a portion of the oxidant side of the interconnect can be selectively electropolished, or the entire oxidant side or the entire interconnect can be electropolished, and thereafter selected surfaces of the interconnect (for example the via surfaces) can be abraded to remove material from those surfaces.

Figure 3C:
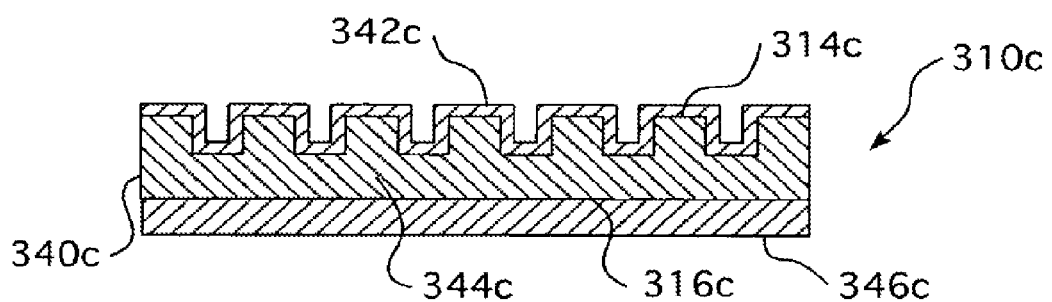

Alternatively, a layer, such as a layer of a nickel-base superalloy or other material that has reasonable electrical properties and oxidation resistance in air, may be connected (for example, by cladding) to the side of the interconnect opposite the metallic material (i.e., the oxidant side of the interconnect). For example, according to one non-limiting embodiment and as shown in FIG. 3c, the interconnect (generally indicated as 310c) may comprise a body 340c that is formed from a ferritic stainless steel 344c and has a fuel side 314c and an oxidant side 316c opposite the fuel side. A metallic material 342c that forms an oxide having a dissociation pressure greater than a partial pressure of oxygen proximate the fuel side 314c of the interconnect 310c during operation of the SOFCs may be connected to at least a portion of the ferritic stainless steel 344c on the fuel side 314c of the body 340c as previously discussed. Alternatively, although not shown in FIG. 3c, the body of the interconnect may be a composite body as described above with respect to FIG. 3b. Further, according to this non-limiting embodiment, a layer 346c of a nickel-base superalloy or other material that has similar electrical properties and oxidation resistance to nickel-base superalloys in air, may be connected to the oxidant side 316c of the interconnect 310c to reduce or prevent oxidation of the ferritic stainless steel 344c on the oxidant side 316c due to exposure to the environment proximate the cathode during operation of the SOFC. Examples nickel-base superalloys that may be used in connection with this non-limiting embodiment include, without limitation, Alloy 600 alloy (also designated UNS-N06600), Alloy 625 (also designated UNS-N06625), and Alloy HX (also designated UNS-N06002). Other nickel-base superalloys having aluminum and silicon levels no greater than 0.5 weight percent are also contemplated for use in connection with this non-limiting embodiment, for example, Alloy 230 (also designated UNS-N06230), which may include, in weight percent, up to 0.3 aluminum and up to 0.4 silicon.

While nickel-base superalloys generally have a good combination of properties for use in interconnects, such as good electrical conductivity and oxidation resistance, because nickel-base superalloys can be expensive and generally have a CTE that is substantially higher than the CTE ceramic electrodes, the use of nickel-base superalloys in interconnect applications can be limited in certain applications. However, by balancing the thicknesses and CTEs of the various components of the interconnects, both the cost of the nickel-base superalloy and effect of the relatively high CTE of the nickel-base superalloy can be mitigated. For example, according to one non-limiting embodiment, the ferritic stainless steel component of the interconnect can comprise from 60 to 80 percent of the total thickness of the interconnect, with the metallic material on the fuel side of the interconnect and nickel-base superalloy layer on the oxidant side of the interconnect each comprising from 10 to 20 percent of the total thickness of the interconnect. Further, although not required, if metallic material on the fuel side has a CTE that is higher than the CTE of the nickel-base superalloy layer on the oxidant side, the metallic material can have a thickness that is less than the thickness of nickel-base superalloy layer, so as to evenly distribute the CTE mismatch on either side of the interconnect. Conversely, if the nickel-base layer on the oxidant side of the interconnect has a higher CTE than metallic material on the fuel side of the interconnect, the nickel-base superalloy layer can have a thickness that is less than the thickness of metallic material on the fuel side. For example, although not limiting herein, if the metallic material on the fuel side has a CTE that is 10% higher than the CTE of the nickel-base superalloy layer on the oxidant side, the metallic material on the fuel side can have a thickness than is 10% less than that of the nickel-base superalloy.

With continued reference to FIG. 3c, since metallic material 342c and layer 346c prevent ferritic stainless steel 344c from being directly exposed to the environment surrounding the anode and the cathode, respectively, the oxidation resistance of the ferritic stainless steel according to these non-limiting embodiments has a relatively small affect on the overall electrical performance of the interconnect. Consequently, according to this non-limiting embodiment, ferritic stainless steels having low alloy and/or low chromium content, which are generally less expensive but have lower oxidation resistance then more highly alloyed ferritic stainless steels, can be used to form body 340c. Non-limiting examples of low alloy and/or low chromium containing ferritic stainless steels that can be used in conjunction with these non-limiting embodiments include ferritic stainless steels designated Type 409 (e.g., Fe-11Cr ferritic stainless steels, also designated as UNS-S40900, UNS-S40920, and UNS-S40930) and Type 430 (e.g., Fe-16Cr ferritic stainless steels, also designated as UNS-S43000).

As previously discussed, although ferritic stainless steels tend to oxidize when exposed to the oxidant-rich environment near the cathode of the SOFC during operation (i.e., the environment proximate the oxidant side of the interconnect), the oxide scale formed on the surface of the stainless steel tends to be slow growing and electrically conductive. Thus, according to various non-limiting embodiments disclosed herein, at least the portion of the interconnect that is in contact with the oxidant-rich environment near the cathode of the SOFC (i.e., the oxidant side of the interconnect) is formed from stainless steel, and in particular, a ferritic stainless steel. Alternatively, an additional layer, such as a layer of a nickel-base superalloy or other material that has reasonable oxidation resistance in air, may be connected (for example, by cladding) to the oxidant-side of the interconnect as discussed above with respect to FIG. 3c.

Figure 6:
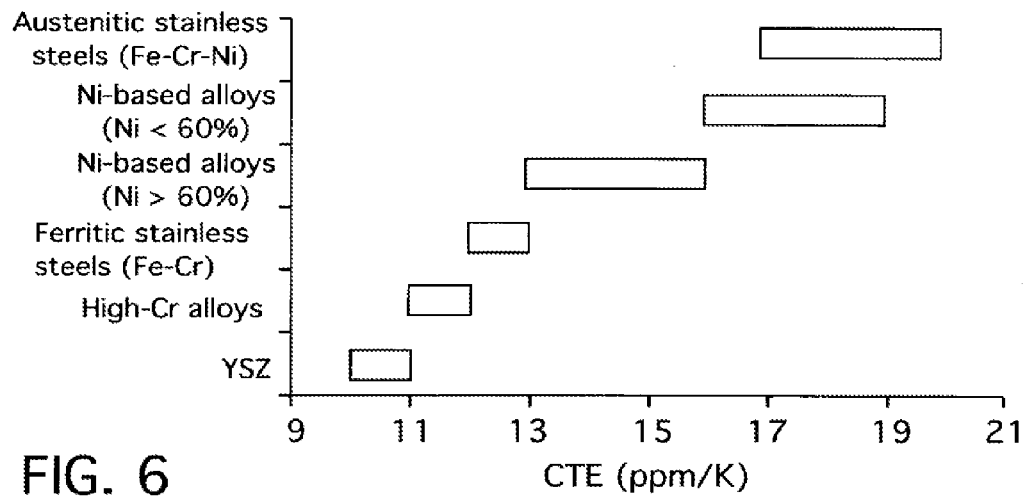
FIG. 6 is a graph of the coefficients of thermal expansion for several materials.

Referring now to FIG. 6, as previously discussed, ferritic stainless steels generally have lower CTEs than austenitic stainless steels, as well as other materials that have been proposed for use as interconnects for SOFCs, such as the nickel-based alloys shown in FIG. 6. Since interconnects for SOFCs generally must have a CTE that is sufficiently similar to the CTE of the ceramic electrodes within the SOFCs to ensure the requisite structural integrity and gas-tightness of the assembly, it is generally desirable for the interconnects to be formed from a material that has a CTE that matches the CTEs of the electrodes as closely as possible. Accordingly, by forming the interconnect bodies from ferritic stainless steels, rather than austenitic stainless steels or nickel-base superalloys which have higher CTEs than ferritic stainless steel, and by balancing the proportion of ferritic stainless steel to the metallic material which forms an oxide having a dissociation pressure that is greater than the $pO_2$ proximate the fuel side of the interconnect during operation of an SOFC (and to the nickel-base superalloy layer, if present), the CTE of the interconnects according to various non-limiting embodiments disclosed herein can be adjusted for compatibility with the ceramic electrodes of the SOFCs.

The CTE of the interconnects according to various non-limiting embodiments disclosed herein that comprise both a ferritic stainless steel and a metallic material that forms an oxide having a dissociation pressure that is greater than the $pO_2$ proximate the fuel side of the interconnect during operation of an SOFC, and optionally comprise an additional layer of a nickel-base superalloy on the oxidant side as discussed above with respect to FIG. 3c, can be approximated according to the following equations:

$$CTE_{(I)} = CTE_{(fss)} X_{(fss)} + CTE_{(mm)} X_{(mm)} + CTE_{(Ni)} X_{(Ni)} \quad \text{Eq. 1}$$

$$X_{(fss)} = t_{(fss)} / (t_{(fss)} + t_{(mm)} + t_{(Ni)}) \quad \text{Eq. 2}$$

$$X_{(mm)} = t_{(mm)} / (t_{(fss)} + t_{(mm)} + t_{(Ni)}) \quad \text{Eq. 3}$$

$$X_{(Ni)} = t_{(Ni)} / (t_{(fss)} + t_{(mm)} + t_{(Ni)}) \quad \text{Eq. 4}$$

wherein $CTE_{(I)}$ is the overall coefficient of thermal expansion of the interconnect, $CTE_{(fss)}$ is the coefficient of thermal expansion of the ferritic stainless steel, $CTE_{(mm)}$ is the coefficient of thermal expansion of the metallic material which forms an oxide having a dissociation pressure that is greater than the $pO_2$ proximate the fuel side of the interconnect during operation of an SOFC, and $CTE_{(Ni)}$ is the coefficient of thermal expansion of the nickel-base superalloy. The variables $X_{(fss)}$, $X_{(mm)}$, and $X_{(Ni)}$ in Eq. 1 are given by Eqs. 2-4 above, wherein $t_{(fss)}$ is the thickness of the ferritic stainless steel, $t_{(mm)}$ is the thickness of the metallic material, and $t_{(Ni)}$ is the thickness of the layer of the nickel-base superalloy. In other words, $CTE_{(I)}$ is equal to a sum of the CTEs of each component (i.e., the ferritic stainless steel, the metallic material, and the layer of the nickel-base superalloy if present) weighted by each component's fraction of the total thickness of the interconnect. It will be appreciated that if the interconnect does not include a nickel-base superalloy layer on the oxidant side of the interconnect, the foregoing equations can be simplified to eliminate the terms related to this component.

For example, according to various non-limiting embodiments disclosed herein, the composition of the ferritic stainless steel, the composition of the metallic material, the composition of the nickel-base superalloy layer on the oxidant side of the interconnect if present, and the fractional thicknesses of each of these components to the total combined thickness can be selected such that the interconnect has an average coefficient of thermal expansion no greater than 17 ppm/K. According to other non-limiting embodiments, the ratios and materials can be chosen so as to provide an interconnect having a CTE no greater than 15 ppm/K or no greater than 13 ppm/K. However, as discussed above, it is generally desirable to match the CTE of the interconnect to the CTE of the ceramic electrodes as closely as possible. Accordingly, the interconnects according to various non-limiting embodiments disclosed herein can have any CTE necessary to provide for suitable performance and reliability of the SOFCs or the PSOFC into which they are incorporated.

As discussed above, according to various non-limiting embodiments disclosed herein, the side of the interconnect opposite the metallic material (i.e., the oxidant side of the interconnect) may be electropolished. For example, although not limiting herein, the interconnect may be electropolished by placing the interconnect in a bath containing an electropolishing solution (which typically contains an acid and a carrier), electrically connecting the interconnect to a cathode, and passing current between the interconnect and the cathode so that material is electrochemically removed from the surface of the interconnect. Further, although not limiting herein, the oxidant side of the interconnect may be selectively electropolished, for example, by masking-off certain surfaces or regions of the interconnect (for example, the via surfaces) prior to placing the interconnect into the bath containing the electropolishing solution so as to avoid electropolishing of those surfaces. Alternatively, as previously discussed, the entire oxidant side of the interconnect can be electropolished and thereafter certain surfaces of the interconnect (for example, the via surfaces) can be physically or chemically abraded to reduce or eliminate the effects of electropolishing at those surfaces.

Examples of ferritic stainless steels that can be used to form the interconnects of various non-limiting embodiments disclosed herein include, but are not limited to, ferritic stainless steels comprising at least 12 weight percent chromium. According to one non-limiting embodiment, the ferritic stainless steel may comprise at least 18 weight percent chromium, may further comprise from 18 to 35 weight percent chromium, and may still further comprise from 20 to 28 weight percent chromium. Ferritic stainless steels comprising at least 20 weight percent chromium are believed to be particularly useful in conjunction with various non-limiting embodiments disclosed herein, since such "high-chromium containing" ferritic stainless steels tend to form oxide scales having relatively low electrical resistivity. Specific, non-limiting examples of commercially available ferritic stainless steels comprising at least 20 weight percent chromium include AL 453™ ferritic stainless steel and E-Brite® ferritic stainless steel.

According to still other non-limiting embodiments, the ferritic stainless steel can be a high-chromium containing ferritic stainless steel alloy that further comprises rare earth metal ("REM") alloying additions. Although not limiting herein, it is contemplated that the addition of REMs to a high-chromium containing alloy (such as the AL 453™ ferritic stainless steel alloy discussed above) may result in the formation of an adherent, slow-growing chromium-oxide scale at high temperatures. REM in the form of mischmetal may be added during production of the ferritic stainless steel. Mischmetal is an available commercial form of mixed REMs and can be obtained with different compositions having known concentrations of the REMs cerium, lanthanum and praseodymium. For example, a common mischmetal form used in steelmaking is nominally 50Ce-30La-20Pr by weight.

According to other non-limiting embodiments, the ferritic stainless steel can be low in alloying elements that form continuous oxides having electrical resistivity that is greater than the electrical resistivity of chromium oxide. Non-limiting examples of alloying elements that form continuous oxides having electrical resistivity that is greater than the electrical resistivity of chromium oxide include aluminum and silicon. For example, stainless steels comprising less than 0.1 weight percent aluminum and/or less than 0.1 weight percent silicon; and ferritic stainless steels comprising from 0 to 0.005 weight percent aluminum and/or from 0 to 0.005 weight percent silicon can be used in accordance with various non-limiting embodiments disclosed herein. Although not limiting herein, it is contemplated that by reducing the amount of alloying elements in the ferritic stainless steel that form continuous oxides having an electrical resistivity greater than that of chromium oxide, the chromium-rich oxide and/or manganese-chromate spinel scale that forms on a ferritic stainless steel interconnect during operation of a PSOFC may have improved electrical properties as compare to interconnects made using conventional ferritic stainless steels.

Further, the ferritic stainless steels according to various non-limiting embodiments disclosed herein can comprise from greater than 1 weight percent to 2 weight percent manganese. As previously discussed, manganese can segregate to the surface of a ferritic stainless steel during oxidation at high temperatures thereby forming a scale comprising a manganese-chromate spinel (e.g., $MnCr_2O_4$). As discussed above, the formation of a scale comprising manganese-chromate spinel on the surface of the ferritic stainless steel during oxidation may reduce chromium migration from the surface of the ferritic stainless steel. While not limiting herein, it is contemplated that the maximum resistance to chromium migration may be achieved when the manganese-chromate spinel formed on the ferritic stainless steel surface is saturated or nearly saturated with manganese, which generally requires a manganese content of greater than 1 weight percent of the ferritic stainless steel. Therefore, the ferritic stainless steels according to certain non-limiting embodiments disclosed herein may comprise greater than 1 weight percent manganese, may further comprise at least 1.5 weight percent manganese, and may still further comprises at least 1.6 weight percent manganese.

However, since the overall thickness of the scale on the surface of the ferritic stainless steel tends to increase with increasing manganese content, for certain applications it may be desirable to prevent the formation of thick scales on the surface of the ferritic stainless steel (at least in the electrical contact areas) in order to keep the ASR of the interconnect as low as practicable. Therefore, according to various non-limiting embodiments disclosed herein, the amount of manganese present in the ferritic stainless steel may range from greater than 1 weight percent to 2 weight percent, may further range from at least 1.5 weight percent to 2 weight percent, and may still further range from 1.6 weight percent to 2 weight percent.

Non-limiting examples of ferritic stainless steels that may be used to form interconnects according to various non-limiting embodiments disclosed herein and that have a high-chromium content, that optionally contain REMs, and that are both low in alloying elements that form continuous oxides having electrical resistivity that is greater than the electrical resistivity of chromium oxide and contain from greater than 1 to 2 weight percent manganese are set forth below in Table II.

TABLE II

| Element | Composition 1 (Weight Percent) | Composition 2 (Weight Percent) | Composition 3 (Weight Percent) | Composition 4 (Weight Percent) |
| --- | --- | --- | --- | --- |
| Aluminum | 0 to <0.1 | 0 to 0.05 | 0 to 0.05 | 0 to 0.05 |
| Silicon | 0 to <0.1 | 0 to 0.05 | 0 to 0.05 | 0 to 0.05 |
| Chromium | 21 to 35 | 21 to 24 | 23 to 27 | 23 to 27 |
| Manganese | >1 to 2 | >1 to 2 | >1 to 2 | >1 to 2 |
| Carbon | 0.002 to 0.1 | 0.002 to 0.1 | 0.002 to 0.1 | 0.002 to 0.1 |
| Nitrogen | 0 to 0.04 | 0 to 0.04 | 0 to 0.04 | 0 to 0.04 |
| Molybdenum | 0 to 1 | 0 to 1 | 0 to 1 | 0.75 to 1 |
| Nickel | 0 to 0.5 | 0 to 0.3 | 0 to 0.3 | 0 to 0.3 |
| Lanthanum | 0 to 0.05 | 0.02 to 0.04 | 0 to 0.05 | 0 to 0.05 |
| Cerium | 0 to 0.1 | * | 0 to 0.1 | 0 to 0.1 |
| Zirconium | 0 to 0.1 | 0 to 0.1 | 0 to 0.1 | 0 to 0.05 |
| Titanium | 0 to 0.5 | 0 to 0.1 | 0 to 0.5 | ** |
| Tantalum | 0 to 0.1 | 0 to 0.1 | 0 to 0.1 | ** |
| Niobium | 0 to 0.2 | 0 to 0.1 | 0.05 to 0.2 | ** |
| Iron & Impurities | Balance | Balance | Balance | Balance |

\* Weight Percent Cerium + Weight Percent Lanthanum ranges from 0.03 to 0.06.
\*\* Given by: 0.4 weight percent $\leq$ [% Nb + % Ti + ½(% Ta)] $\leq$ 1 weight percent.

With respect to Composition 1 (above), the amount of aluminum and/or silicon in the ferritic stainless steel compositions set forth in Table II above may range from 0 to 0.05 weight percent. Further, with respect to Compositions 1-4 (above), the amount of aluminum and/or silicon may range from 0.005 to 0.05 weight percent. Still further, with respect to Compositions 1-4, the amount of manganese may range from 1.5 to 2 weight percent, and may further range from 1.6 to 2 weight percent.

As previously discussed, various non-limiting embodiments of the present disclosure relate to ferritic stainless steels, and in particular, ferritic stainless steels that may be useful in fabricating interconnects according to various non-limiting embodiments disclosed herein. For example, one non-limiting embodiment provides a ferritic stainless steel comprising Composition 1 as set forth above in Table II. Further, according to this non-limiting embodiment, the ferritic stainless steel can comprise from 0 to 0.05 weight percent aluminum and/or silicon or from 0.005 to 0.05 weight percent aluminum and/or silicon. Still further, the ferritic stainless steel according to this non-limiting embodiment may comprise from 1.5 to 2 weight percent manganese or from 1.6 to 2 weight percent manganese.

Another non-limiting embodiment provides a ferritic stainless steel comprising Composition 2 as set forth above in Table II. Further, according to this non-limiting embodiment, the ferritic stainless steel can comprise from 0.005 to 0.05 weight percent aluminum and/or silicon. Still further, the ferritic stainless steel according to this non-limiting embodiment may comprise from 1.5 to 2 weight percent manganese or from 1.6 to 2 weight percent manganese.

Another non-limiting embodiment provides a ferritic stainless steel comprising Composition 3 as set forth above in Table II. Further, according to this non-limiting embodiment, the ferritic stainless steel can comprise from 0.005 to 0.05 weight percent aluminum and/or silicon. Still further, the ferritic stainless steel according to this non-limiting embodiment may comprise from 1.5 to 2 weight percent manganese or from 1.6 to 2 weight percent manganese.

Another non-limiting embodiment provides a ferritic stainless steel comprising Composition 4 as set forth above in Table II. Further, according to this non-limiting embodiment, the ferritic stainless steel can comprise from 0.005 to 0.05 weight percent aluminum and/or silicon. Still further, the ferritic stainless steel according to this non-limiting embodiment may comprise from 1.5 to 2 weight percent manganese or from 1.6 to 2 weight percent manganese. Additionally, the amounts of one or more of niobium, titanium, and/or tantalum may be further chosen to satisfy the equation 0.5 weight percent $\leq [\% \text{Nb} + \% \text{Ti} + \frac{1}{2}(\% \text{Ta})] \leq 1$ weight percent, or may be chosen to satisfy the equation 0.5 weight percent $\leq [\% \text{Nb} + \% \text{Ti} + \frac{1}{2}(\% \text{Ta})] \leq 0.75$ weight percent. Further, according to various non-limiting embodiments, the amount of titanium in Composition 4 can be no greater than 0.5 weight percent.

The ferritic stainless steels according to various non-limiting embodiments disclosed herein can also be essentially free of silver, calcium oxide, and/or titanium. As used herein with respect to the composition of the ferritic stainless steel, the term "essentially free of" means that no more than impurity or residual levels of the specified element(s) are present in the ferritic stainless steel.

Other non-limiting embodiments disclosed herein provide interconnects made from the ferritic stainless steels set forth above. For example, one non-limiting embodiment provides an interconnect for SOFCs, the interconnect comprising a ferritic stainless steel comprising Composition 1. Further, as discussed above, according to this non-limiting embodiment, the ferritic stainless steel can comprise from 0 to 0.05 weight percent aluminum and/or silicon or from 0.005 to 0.05 weight percent aluminum and/or silicon. Still further, the ferritic stainless steel according to this non-limiting embodiment may comprise from 1.5 to 2 weight percent manganese or from 1.6 to 2 weight percent manganese.

Another non-limiting embodiment provides an interconnect for SOFCs, the interconnect comprising a ferritic stainless steel comprising a composition as set forth for Composition 2, 3 or 4 above. Further, as discussed above, according to this non-limiting embodiment, the ferritic stainless steel can comprise from 0.005 to 0.05 weight percent aluminum and/or silicon. Still further, the ferritic stainless steel may comprise from 1.5 to 2 weight percent manganese or from 1.6 to 2 weight percent manganese.

As previously discussed, various non-limiting embodiments disclosed herein relate to PSOFCs made using the interconnects according to any of the foregoing non-limiting embodiments. For example, one non-limiting embodiment provides a PSOFC comprising a first solid oxide fuel cell having an anode, a cathode, and a solid oxide electrolyte between the anode and the cathode; a second solid oxide fuel cell having an anode, a cathode, and a solid oxide electrolyte between the anode and the cathode, the second solid oxide fuel cell being positioned such that the anode of the first solid oxide fuel cell is adjacent the cathode of the second solid oxide fuel cell, and an interconnect interposed between the first and second solid oxide fuel cells. According to this non-limiting embodiment, the interconnect is formed from a ferritic stainless steel and comprises a fuel side positioned adjacent the anode of the first solid oxide fuel cell, the fuel side comprising at least one via and at least one gas flow channel, and an oxidant side opposite the fuel side of the interconnect and adjacent the cathode of the second solid oxide fuel cell, the oxidant side of the interconnect being formed from a ferritic stainless steel and comprising at least one via that when subjected to an oxidizing atmosphere at a temperature of at least 650° C. develops a scale comprising a manganese-chromate spinel on at least a portion of a surface thereof and at least one gas flow channel that when subjected to an oxidizing atmosphere at a temperature of at least 650° C. develops an aluminum-rich oxide scale on at least a portion of a surface thereof, the aluminum-rich oxide scale comprising iron and chromium and having a hematite structure.

Further, according to various non-limiting embodiments disclosed herein, the fuel side of the interconnect can comprise a ferritic stainless steel and at least one via of the fuel side may develop a scale comprising a manganese-chromate spinel on at least a portion of a surface thereof when subjected to an oxidizing atmosphere at a temperature of at least 650° C. Still further, at least one gas flow channel of the fuel side may develop an aluminum-rich oxide scale on at least a portion of a surface thereof, the aluminum-rich oxide scale comprising iron and chromium and having a hematite structure, when subjected to an oxidizing atmosphere at a temperature of at least 650° C.

Alternatively, the fuel side of the interconnect may comprise a ferritic stainless steel having a metallic material that forms an oxide having a dissociation pressure greater than the $pO_2$ proximate the fuel side of the interconnect during operation of the PSOFC connected to at least a portion of a surface thereof. Still further, the fuel side can be formed from a metallic material that forms an oxide having a dissociation pressure greater than the $pO_2$ proximate the fuel side of the interconnect during operation of the PSOFC. Non-limiting examples of suitable ferritic stainless steels and metallic materials that form oxides having a dissociation pressure greater than the $pO_2$ proximate the fuel side of the interconnect during operation of the PSOFC are set forth above in detail.

Another non-limiting embodiment provides a PSOFC comprising a first solid oxide fuel cell having an anode, a cathode, and a solid oxide electrolyte between the anode and the cathode; a second solid oxide fuel cell having an anode, a cathode and a solid oxide electrolyte between the anode and the cathode, the second solid oxide fuel cell being positioned such that the anode of the first solid oxide fuel cell is adjacent the cathode of the second solid oxide fuel cell; and an interconnect interposed between the first and second solid oxide fuel cells. According to this non-limiting embodiment, the interconnect has an oxidant side comprising a ferritic stainless steel, and a fuel side opposite the oxidant side of the interconnect, the fuel side comprising a metallic material that forms an oxide having a dissociation pressure greater than a $pO_2$ proximate the fuel side of the interconnect during operation of the planar solid oxide fuel cell. More particularly, according to this non-limiting embodiment, the interconnect is interposed between the first solid oxide fuel cell and the second solid oxide fuel cell such that the fuel side of the interconnect is adjacent the anode of the first solid oxide fuel cell, and the oxidant side of the interconnect is adjacent the cathode of the second solid oxide fuel cell. Further, according to this non-limiting embodiment, the fuel side of the interconnect may be formed from a ferritic stainless steel and the metallic material that forms an oxide having a dissociation pressure greater than a $pO_2$ proximate the fuel side of the interconnect during operation of the PSOFC connected to at least a portion of the ferritic stainless steel.

Methods of making interconnects according to various non-limiting embodiments disclosed herein will now be discussed. One non-limiting embodiment provides a method of making an interconnect comprising forming an interconnect from a ferritic stainless steel, the interconnect having a fuel side and an oxidant side opposite the fuel side, each of the fuel side and oxidant side comprising a via and a gas flow channel, and electropolishing at least a portion of at least one gas flow channel of the oxidant side of the interconnect.

For example, according to this non-limiting embodiment, electropolishing can comprise selectively electropolishing at least a portion of at least one gas flow channel of the oxidant side of the interconnect. More particularly, according to this non-limiting embodiment, selective electropolishing may comprise masking those portions of the interconnect that are not to be electropolished using a masking material. For example, the vias of the oxidant side, the entire fuel side or, if the gas flow channels of the fuel side are to be selectively electropolished, the vias of the fuel side can be masked to avoid electropolishing of those portions. Non-limiting examples of suitable masking materials include photoresists, waxes, and masking tapes. Thereafter, the interconnect can be electropolished as discussed above. After electropolishing, the masking material can be removed by known methods.

Optionally, before or after selective electropolishing, a metallic material that forms an oxide having a dissociation pressure greater than the $pO_2$ proximate the fuel side of the interconnect during operation of the PSOFC can be connected to the fuel side. Alternatively, the metallic material can be connected to the ferritic stainless steel prior to forming the interconnect. Non-limiting methods connecting metallic materials that form oxides having a dissociation pressure greater than the $pO_2$ proximate the fuel side of the interconnect during operation of the PSOFC are described below in more detail.

Another non-limiting embodiment provides a method of making an interconnect comprising forming an interconnect from a ferritic stainless steel, the interconnect having a fuel side and an oxidant side opposite the fuel side, each of the fuel side and oxidant side comprising a via and a gas flow channel, electropolishing at least a portion of the oxidant side of the interconnect, and physically or chemically removing material from at least one electropolished surface of at least one via of the oxidant side of the interconnect. Optionally, a metallic material that forms an oxide having a dissociation pressure greater than the $pO_2$ proximate the fuel side of the interconnect during operation of the PSOFC can be connected to the fuel side of the interconnect after the interconnect is formed, either before or after electropolishing. Alternatively, the metallic material can be connected to the ferritic stainless steel prior to forming the interconnect.

Another non-limiting embodiment provides a method of making an interconnect comprising connecting a metallic material on at least a portion of a surface of the ferritic stainless steel sheet material, the metallic material being nickel or a nickel alloy, copper or a copper alloy, or a nickel-copper alloy, and forming an interconnect from the ferritic stainless steel sheet material, the interconnect having a oxidant side comprising ferritic stainless steel and a fuel side opposite the oxidant side comprising the metallic material, each of the oxidant side and fuel side of the interconnect comprising a via and a gas flow channel. As discussed in more detail below, according to this non-limiting embodiment, forming the interconnect can occur prior to, during, or after connecting the metallic material to at least a portion of the ferritic stainless steel.

Optionally, according to the forgoing non-limiting embodiment, at least a portion of at least one gas flow channel of the oxidant side of the interconnect can be electropolished, for example by selective electropolishing; or the entire oxidant side can be electropolished and, thereafter, material may be removed from a portion of at least one electropolished via surface (as previously discussed). Alternatively, the ferritic stainless steel can be electropolished before connecting the metallic material thereto or after connecting the metallic material but prior to forming the interconnect.

Still further, according to various non-limiting embodiments, a layer of a nickel-base superalloy can be connected to a surface of the ferritic stainless steel opposite the surface to which the metallic material is connected prior to forming the interconnect, for example by hot rolling or cold roll bonding. For example, according to one non-limiting embodiment, a ferritic stainless steel slab can interposed between a layer of the metallic material and a layer of the nickel-base superalloy. Thereafter, the stack can be clad together and processed to the desired thickness by hot rolling. Alternatively, each of the materials can be processed into sheets or coils having a desired thickness prior to being clad together in a cold bonding process.

According to various non-limiting embodiments disclosed herein, the ferritic stainless steel can be a ferritic stainless steel sheet material that has been rolled to a desired thickness or finished gauge. For example, the ferritic stainless steel sheet material can be formed from a slab (or another coil or sheet) having a thickness that is greater than the desired thickness by rolling the slab, coil or sheet to a desired thickness using one or more conventional hot and/or cold rolling processes.

Methods of connecting a metallic material to at least a portion of a ferritic stainless steel according to various non-limiting embodiments disclosed herein include, without limitation, plating, cladding, fastening, joining, and combinations thereof. As used herein the term "plating" means building up of one material on another. Non-limiting examples of suitable plating techniques include, without limitation, electroplating, electroless plating, as well as other physical or chemical deposition techniques (such as but not limited to sputtering, plasma vapor deposition, chemical vapor deposition, and thermal or flame spraying) that involve the build up of one material on another.

As used herein the term "cladding" means bringing two or more materials into direct contact with each other using pressure or pressure and temperature. Non-limiting examples of suitable cladding methods include, without limitation, hot and cold roll bonding, as well as other thermo-mechanical bonding techniques such as explosive bonding and forging.

As used herein the term "fastening" means mechanically connecting or interlocking two or more materials, such as with a fastener or some other attachment device or interlocking geometry. For example, although not limiting herein, the metallic material can be fastened to the ferritic stainless steel by crimping the metallic material and the ferritic stainless steel together to interlock the two materials.

As used herein the term "joining" means bonding two materials together such as by welding, brazing or soldering. For example, according to one non-limiting embodiment, the metallic material can be brazed to the ferritic stainless steel.

According to one specific non-limiting embodiment, connecting the metallic material to at least a portion of the ferritic stainless steel comprises at least one of plating the metallic material on at least a portion of a surface of the stainless steel and cladding the metallic material on at least a portion of a surface of the stainless steel.

Non-limiting methods of forming an interconnect that can be used in conjunction with various non-limiting embodiments disclosed herein include forging, stamping, coining, machining, chemically milling and combinations thereof. According to one non-limiting embodiment, forming the interconnect can comprise, for example, stamping a sheet of ferritic stainless steel into the desired geometry. Alternatively, according to this non-limiting embodiment, the interconnect can be formed using a combination of stamping and machining. According to another non-limiting embodiment forming the interconnect may comprise providing a ferritic stainless steel blank, applying a masking material to those portions of the ferritic stainless steel blank that are to be retained, and chemically milling the blank to remove material from the unmasked portion of the blank to form an interconnect having at least one via and at least one gas flow channel. Thereafter, the interconnect can be electropolished and after electropolishing the masking material. For example, according to this non-limiting embodiment, the portions of the ferritic stainless steel blank that are masked may be those portions of the blank that form the vias in the interconnect. These and other methods of forming interconnects are known in the art.

As previously discussed, according to various non-limiting embodiments disclosed herein, forming the interconnect can occur prior to, during, or after connecting the metallic material to at least a portion of the ferritic stainless steel. For example, according to one non-limiting embodiment, wherein forming the interconnect occurs prior to connecting the metallic material to the ferritic stainless steel, the method of making an interconnect can comprise providing a ferritic stainless steel sheet material, forming an interconnect from the ferritic stainless steel sheet material, and plating a metallic material on at least a portion of at least one surface of the interconnect, the metallic material being nickel or a nickel alloy, copper or a copper alloy, or a nickel-copper alloy. Optionally, according to this non-limiting embodiment, a layer of a nickel-base superalloy may be clad to the ferritic stainless steel prior to forming the interconnect such that after forming, the interconnect has a first side comprising the nickel-base superalloy and a second side opposite the first side comprising the ferritic stainless steel. Thereafter, the metallic material may be plated on the ferritic stainless steel of the second side of the interconnect.

According to another non-limiting embodiment, wherein forming the interconnect occurs after the metallic material is connected to the ferritic stainless steel, the method of making an interconnect can comprise providing a ferritic stainless steel sheet material, cladding a metallic material on at least a portion of at least one surface of the ferritic stainless steel sheet material, the metallic material being nickel or a nickel alloy, copper or a copper alloy, or a nickel-copper alloy; and forming an interconnect from the clad ferritic stainless steel sheet material. Further, according to this non-limiting embodiment, prior to forming the interconnect from the clad ferritic stainless steel sheet material, the clad ferritic stainless steel sheet material can be processed to a finished gauge, for example, by rolling. Optionally, according to this non-limiting embodiment, the metallic material can be clad onto a first surface of the ferritic stainless steel and a layer of a nickel-base superalloy can be clad to a second surface of the ferritic stainless steel that is opposite the first surface.

According to still another non-limiting embodiment, wherein forming the interconnect occurs at essentially the same time as connecting the metallic material to the ferritic stainless steel, the method of making an interconnect can comprise providing a ferritic stainless steel sheet material in a die, placing a sheet or foil of a metallic material next to at least a portion of the ferritic stainless steel sheet material, the metallic material being nickel or a nickel alloy, copper or a copper alloy, or a nickel-copper alloy; and forming the interconnect by forging under heat and pressure such that the ferritic stainless steel and the metallic material are simultaneously formed into an interconnect and clad together. Optionally, according to this non-limiting embodiment, the sheet or foil of the metallic material can be placed next to a first side of the ferritic stainless steel sheet material, and a sheet or foil of a nickel-base superalloy can be placed next to a second side of the ferritic stainless steel, opposite the first side, and thereafter the stack can be forged to form the interconnect.

The following non-limiting examples are intended to facilitate understanding of various aspects of the present disclosure and are not intended to be limiting herein.

EXAMPLES

Example 1

Three samples of each of the two ferritic stainless steels were obtained and tested as follows. The first set of three ferritic stainless steel samples were samples of AL 453™ alloy (the nominal composition for which alloy is set forth above in Table I). These three samples were electropolished prior to testing as discussed below. The second set of three ferritic stainless steel samples were samples of E-BRITE® alloy (the nominal composition for which alloy is set forth above in Table I) and were tested without electropolishing.

Electropolishing of the AL 453™ alloy samples was conducted as follows. The samples to be electropolished were ground with 240 grit silicon carbide wet/dry metallographic grinding paper. The samples were then immersed in an aqueous acid solution having the following composition: 25% sulfuric acid, 47% phosphoric acid, and 28% glycolic acid.

The solution was held at approximately 175° F. and electropolishing was carried out by passing a current of 1 Amp./in$^2$ through the sample for 20 minutes, with the samples being flipped every 5 minutes.

The oxidation resistance of each sample was then evaluated by thermal oxidation cycling. During each thermal oxidation cycle, the samples were exposed to air containing 7% water vapor at a temperature of 760° C., nominally for 160 hours. The cyclic exposure was repeated until achieving a total exposure time of 4000 hours. The weight of each sample was measured after each thermal oxidation cycle and recorded. The results of this testing are presented in FIG. 7 as a plot of weight change per sample surface area (mg/cm$^2$) vs. exposure time (hours) for each sample tested.

Figure 7:
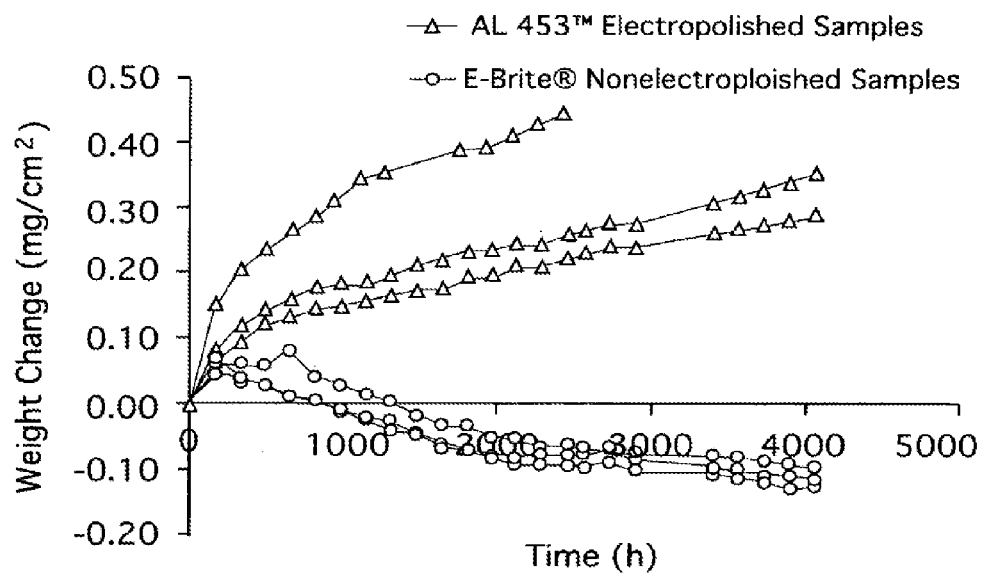
FIG. 7 is a plot of weight change per unit surface area versus time for samples of two different ferritic stainless steels, one of which was electropolished and one of which was not electropolished.

As can be seen from FIG. 7, each of the electropolished samples of AL 453™ alloy gained weight throughout the exposure period, whereas the non-electropolished samples (i.e., the E-BRITE® alloy samples) lost weight after approximately 1000 hours of exposure, and continued to lose weight throughout the remaining exposure period. This weight loss is believed to be attributable to the evolution of chromium-bearing vapor species from the surface of the sample during testing.

Example 2

A sample of AL 453™ alloy (the nominal composition for which alloy is set forth above in Table I) was electropolished as described above in Example 1. Thereafter, a portion of the electropolished surface was mechanically abraded using a diamond-tipped stylus. The sample was then placed in a furnace and heated at 875° C. for 72 hours under air to cause an oxide scale to form on the sample.

Figure 8A:
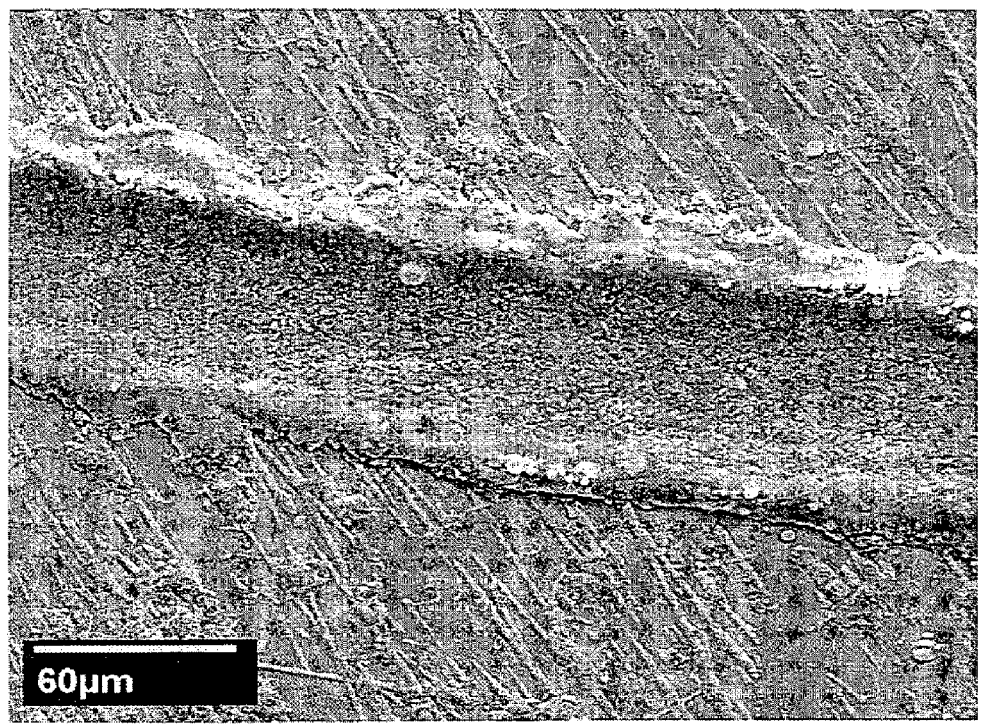
FIG. 8a is a secondary electron image of a surface of ferritic stainless steel that has been electropolished and a portion of which was subsequently abraded.
Figure 8B:
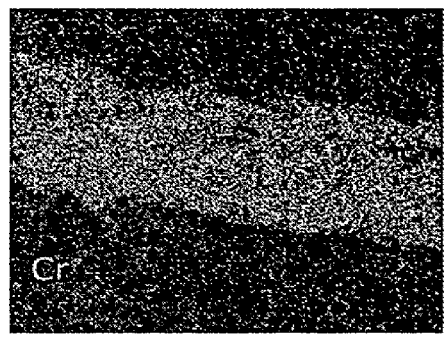
Figure 8C:
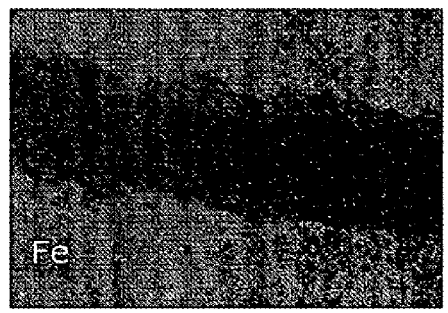
Figure 8D:
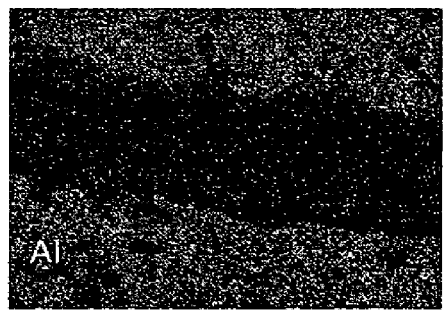
Figure 8E:
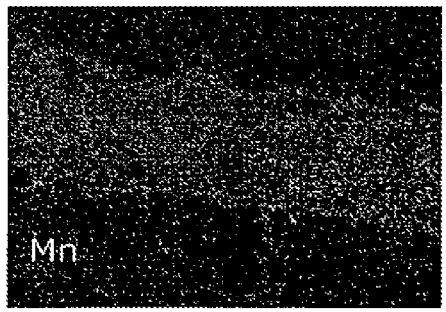

After exposure, the sample was observed using a scanning electron microscope and the characteristic x-rays of several elements were mapped to show the relative amounts of the various elements at or near the surface of the sample. FIG. 8a is the secondary electron image of the sample and FIGS. 8b-8e are characteristic x-ray maps of the same area shown in FIG. 8a obtained using the characteristic x-rays of the elements indicated. In particular, FIG. 8b is an x-ray mapping of the characteristic x-rays of chromium, FIG. 8c is an x-ray mapping of the characteristic x-rays of iron, FIG. 8d is an x-ray mapping of the characteristic x-rays of aluminum, and FIG. 8e is an x-ray mapping of the characteristic x-rays of manganese.

As can be seen from this series of images, the portion of the electropolished surface that was abraded using the diamond-tipped stylus had a higher concentration of chromium and manganese, indicating the formation of a scale of a manganese-chromate spinel in this portion. In contrast, the portions of the electropolished surface that were not abraded had higher concentrations of iron and aluminum, indicating that an aluminum-rich oxide scale developed in these portions and remained intact throughout the oxidation testing. No substantial chromium migration to the aluminum-rich oxide surface was observed.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

What is claimed is:

1. A method of making an interconnect comprising:
    forming an interconnect from a ferritic stainless steel, the interconnect having a fuel side and an oxidant side opposite the fuel side, each of the oxidant side and fuel side comprising a via and a gas flow channel; and
    selectively electropolishing at least a portion of at least one gas flow channel of the oxidant side of the interconnect;
    wherein the ferritic stainless steel comprises from 0.2 to 4 weight percent manganese, from 0.3 to 1 weight percent aluminum, and at least 0.03 weight percent of one or more rare earth elements; and
    wherein the electropolished portion of the at least one gas flow channel develops an aluminum-rich oxide surface scale when subjected to an oxidizing atmosphere at a temperature of at least 650° C., the aluminum-rich oxide surface scale comprising aluminum, iron, and chromium and having a hematite crystal structure.

2. The method of claim 1, further comprising plating at least one metallic material on at least a portion of the fuel side of the interconnect, wherein the at least one metallic material is selected from the group consisting of nickel, a nickel alloy, copper, a copper alloy, and a nickel-copper alloy.

3. The method of claim 1, further comprising cladding at least one metallic material on at least a portion of the fuel side of the interconnect, wherein the at least one metallic material is selected from the group consisting of nickel, a nickel alloy, copper, a copper alloy, and a nickel-copper alloy.

4. The method of claim 1, further comprising electropolishing at least a portion of at least one gas flow channel of the fuel side of the interconnect.

5. A method of making an interconnect comprising:
    forming an interconnect from a ferritic stainless steel, the interconnect comprising a via and a gas flow channel;
    electropolishing at least the oxidant side of the interconnect; and
    physically or chemically removing material from at least one electropolished surface of at least one via of the oxidant side of the interconnect;
    wherein the ferritic stainless steel comprises from 0.2 to 4 weight percent manganese, from 0.3 to 1 weight percent aluminum, and at least 0.03 weight percent of one or more rare earth elements; and
    wherein electropolished surfaces of the oxidant side from which electropolished material is not removed develop an aluminum-rich oxide surface scale when subjected to an oxidizing atmosphere at a temperature of at least 650° C., the aluminum-rich oxide surface scale comprising aluminum, iron, and chromium and having a hematite crystal structure.

6. The method of claim 5, wherein physically or chemically removing material from at least one surface of at least one via of the oxidant side of the interconnect comprises at least one of mechanically polishing, grinding, etching, and milling.

7. The method of claim 5, further comprising electropolishing at least a portion of at least one gas flow channel of the fuel side of the interconnect.

8. A method of making an interconnect comprising:
    connecting at least one metallic material on at least a portion of a surface of a ferritic stainless steel sheet material, wherein the at least one metallic material is selected from the group consisting of nickel, a nickel alloy, copper, a copper alloy, and a nickel-copper alloy;

forming an interconnect from the ferritic stainless steel sheet material, the interconnect having an oxidant side comprising ferritic stainless steel and a fuel side opposite the oxidant side comprising the metallic material, each of the oxidant side and the fuel side of the interconnect comprising a via and a gas flow channel; and electropolishing at least a portion of at least one gas flow channel of the oxidant side of the interconnect wherein the ferritic stainless steel comprises from 0.2 to 4 weight percent manganese, from 0.3 to 1 weight percent aluminum, and at least 0.03 weight percent of one or more rare earth elements; and wherein the electropolished portion of the at least one gas flow channel develops an aluminum-rich oxide surface scale when subjected to an oxidizing atmosphere at a temperature of at least 650° C., the aluminum-rich oxide surface scale comprising aluminum, iron, and chromium and having a hematite crystal structure.

9. The method of claim 8, wherein the electropolishing comprises selectively electropolishing at least a portion of at least one gas flow channel of the oxidant side of the interconnect.

10. The method of claim 8, wherein the electropolishing further comprises electropolishing at least a portion of a surface of at least one via of the oxidant side of the interconnect, and wherein subsequent to electropolishing, material is physically or chemically removed from the electropolished portion of the surface of the at least one via.

11. A method of making an interconnect comprising:
forming an interconnect from a ferritic stainless steel sheet material, the interconnect having an oxidant side and a fuel side opposite the oxidant side, each of the oxidant side and the fuel side of the interconnect comprising a via and a gas flow channel;

electropolishing at least a portion of at least one gas flow channel of the oxidant side of the interconnect; and connecting at least one metallic material to at least a portion of a surface of the fuel side of the interconnect, wherein the at least one metallic material is selected from the group consisting of nickel, a nickel alloy, copper, a copper alloy, and a nickel-copper alloy;

wherein the ferritic stainless steel comprises from 0.2 to 4 weight percent manganese, from 0.3 to 1 weight percent aluminum, and at least 0.03 weight percent of one or more rare earth elements; and wherein the electropolished portion of the at least one gas flow channel develops an aluminum-rich oxide surface scale when subjected to an oxidizing atmosphere at a temperature of at least 650° C., the aluminum-rich oxide surface scale comprising aluminum, iron, and chromium and having a hematite crystal structure.

12. The method of claim 11, wherein the electropolishing comprises selectively electropolishing at least a portion of at least one gas flow channel of the oxidant side of the interconnect.

13. The method of claim 11, wherein the electropolishing further comprises electropolishing at least a portion of a surface of at least one via of the oxidant side of the interconnect, and wherein subsequent to electropolishing, material is physically or chemically removed from the electropolished portion of the surface of the at least one via.

14. The method of claim 11, wherein connecting at least one metallic material to at least a portion of a surface of the fuel side of the interconnect occurs before the electropolishing.

15. The method of claim 11, wherein connecting at least one metallic material to at least a portion of a surface of the fuel side of the interconnect comprises plating at least one metallic material on at least a portion of the fuel side of the interconnect.

16. The method of claim 11, wherein connecting at least one metallic material to at least a portion of a surface of the fuel side of the interconnect comprising cladding at least one metallic material on at least a portion of the fuel side of the interconnect.

* * * * *